(12) United States Patent
Tsurusu et al.

(10) Patent No.: US 12,189,076 B2
(45) Date of Patent: *Jan. 7, 2025

(54) BURIED OBJECT SCANNING DEVICE, DISPLAY CONTROL METHOD FOR BURIED OBJECT SCANNING DEVICE, AND DISPLAY CONTROL PROGRAM

(71) Applicant: OMRON CORPORATION, Kyoto (JP)

(72) Inventors: Tetsuro Tsurusu, Takatsuki (JP); Shingo Kawamoto, Ichinomiya (JP); Ryoji Shimizu, Ichinomiya (JP); Kohei Fujio, Gifu (JP); Yuji Makita, Kakamigahara (JP); Akihiro Ishii, Ichinomiya (JP); Mitsunori Sugiura, Nagoya (JP)

(73) Assignee: OMRON Corporation, Kyoto (JP)

( * ) Notice: Subject to any disclaimer, the term of this patent is extended or adjusted under 35 U.S.C. 154(b) by 362 days.

This patent is subject to a terminal disclaimer.

(21) Appl. No.: 17/495,871

(22) Filed: Oct. 7, 2021

(65) Prior Publication Data

US 2022/0128725 A1   Apr. 28, 2022

(30) Foreign Application Priority Data

Oct. 28, 2020  (JP) ................ 2020-180401

(51) Int. Cl.
*G06F 16/50*    (2019.01)
*G01S 17/50*    (2006.01)
(Continued)

(52) U.S. Cl.
CPC ............... *G01V 3/02* (2013.01); *G01S 17/50* (2013.01); *G06F 3/04845* (2013.01);
(Continued)

(58) Field of Classification Search
CPC ........ G06F 16/40; G06F 16/50; G06F 17/434; G06F 3/04845; G01V 3/02; G01S 17/50
See application file for complete search history.

(56) References Cited

U.S. PATENT DOCUMENTS

| | | | |
|---|---|---|---|
| 5,296,807 A | 3/1994 | Kousek et al. | |
| 8,907,978 B2 * | 12/2014 | Nielsen | G06F 3/0482 345/619 |

(Continued)

FOREIGN PATENT DOCUMENTS

| | | | |
|---|---|---|---|
| JP | H5-45472 A | 2/1993 | |
| JP | H05-281366 A | 10/1993 | |

(Continued)

OTHER PUBLICATIONS

Office Action issued on Jun. 7, 2023 in a related US patent application.

(Continued)

*Primary Examiner* — Daniel A Kuddus
(74) *Attorney, Agent, or Firm* — METROLEX IP LAW GROUP, PLLC; Robert L. Scott, Esq

(57) ABSTRACT

A buried object scanning device includes a capacitance sensor, a search image conversion processing unit, a memory unit, a display unit, an operation input unit, and a display control unit. The capacitance sensor detects a buried object. The search image conversion processing unit converts the detection result of the capacitance sensor into a search image. The memory unit stores search images and a grid layer including grid lines corresponding to a specific scale. The display unit displays the search images and the grid layer. The display control unit controls the display unit to display the search image superimposed with the grid layer (Continued)

and to display the search image in a state of being movable relative to the grid layer, in response to input to the operation input unit.

12 Claims, 24 Drawing Sheets

(51) Int. Cl.
*G01V 3/02* (2006.01)
*G06F 3/04845* (2022.01)
*G06F 16/40* (2019.01)
*G06T 11/00* (2006.01)
*G06F 16/432* (2019.01)

(52) U.S. Cl.
CPC .............. *G06F 16/40* (2019.01); *G06F 16/50* (2019.01); *G06T 11/00* (2013.01); *G06F 16/434* (2019.01)

(56) References Cited

U.S. PATENT DOCUMENTS

| | | | |
|---|---|---|---|
| 8,907,980 B2* | 12/2014 | Nielsen | G09G 5/00 345/629 |
| 8,917,288 B2* | 12/2014 | Nielsen | G09G 5/00 345/629 |
| 8,928,693 B2* | 1/2015 | Nielsen | G06F 3/0482 345/419 |
| 8,929,693 B2* | 1/2015 | Shin | G02B 6/12 385/33 |
| 8,994,749 B2* | 3/2015 | Nielsen | G06F 3/0482 345/629 |
| 9,165,331 B2* | 10/2015 | Nielsen | G06F 16/2365 |
| 9,189,821 B2* | 11/2015 | Nielsen | G06F 16/2365 |
| 10,175,350 B1 | 1/2019 | Tsokos et al. | |
| 2004/0107017 A1 | 6/2004 | Hoffmann et al. | |
| 2006/0071664 A1 | 4/2006 | Fujiwara | |
| 2011/0007076 A1* | 1/2011 | Nielsen | G06F 16/2365 345/441 |
| 2011/0279230 A1* | 11/2011 | Nielsen | G06F 16/29 340/8.1 |
| 2011/0279476 A1* | 11/2011 | Nielsen | G06F 16/2365 345/619 |
| 2011/0283217 A1* | 11/2011 | Nielsen | G09G 5/00 715/771 |
| 2013/0135343 A1* | 5/2013 | Nielsen | G06F 3/0482 345/619 |
| 2013/0170731 A1 | 7/2013 | Hirota | |
| 2013/0174072 A9* | 7/2013 | Nielsen | G06F 16/2365 715/771 |
| 2015/0243054 A1* | 8/2015 | Nielsen | G06T 11/60 345/589 |
| 2015/0332202 A1* | 11/2015 | Nielsen | G06Q 10/06 705/7.42 |
| 2015/0339516 A1 | 11/2015 | Yano et al. | |
| 2017/0131426 A1 | 5/2017 | Sgarz et al. | |
| 2017/0153349 A1 | 6/2017 | Krapf et al. | |
| 2017/0153350 A1 | 6/2017 | Krapf et al. | |
| 2017/0153356 A1 | 6/2017 | Zibold | |
| 2019/0156137 A1 | 5/2019 | Nguyen et al. | |
| 2022/0036042 A1 | 2/2022 | Takata et al. | |
| 2022/0214437 A1* | 7/2022 | Mochizuki | G01S 7/06 |

FOREIGN PATENT DOCUMENTS

| | | |
|---|---|---|
| JP | H11-295045 A | 10/1999 |
| JP | 2000-310734 A | 11/2000 |
| JP | 2000-338255 A | 12/2000 |
| JP | 2003-098263 A | 4/2003 |
| JP | 2004-184286 A | 7/2004 |
| JP | 2005-517231 A | 6/2005 |
| JP | 2005-258821 A | 9/2005 |
| JP | 2006-153783 A | 6/2006 |
| JP | 2010-11210 A | 1/2010 |
| JP | 2013-140042 A | 7/2013 |
| JP | 2015-225234 A | 12/2015 |
| JP | 2017-040547 A | 2/2017 |
| JP | 2017-532528 A | 11/2017 |
| JP | 2019-185253 A | 10/2019 |
| JP | 2019-191927 A | 10/2019 |
| JP | 2020-154467 A | 9/2020 |
| JP | 2020-186994 A | 11/2020 |
| WO | WO 00/02376 * | 6/1999 |

OTHER PUBLICATIONS

Office Action issued on Sep. 5, 2023 in a counterpart Japanese patent application.

Office Action issued on Oct. 3, 2023 in a related US patent application.

Office Action issued on Oct. 10, 2023 in a related Japanese patent application.

Office Action (JPOA) issued on Oct. 31, 2023 in a related Japanese patent application, with English translation.

* cited by examiner

BURIED OBJECT TABLE

| BURIED OBJECT | WIDTH | THICKNESS |
|---|---|---|
| FOUNDATION | 120 | 120 |
| THROUGH-PILLAR | 120 | 120 |
| PILLAR | 120 | 120 |
| STUD | 105 | 30 |
| BEAM | 105 | 150 |
| ... | ... | ... |
| BRACE | 90 | 90 |
| JOIST | 40 | 30 |
| FURRING STRIP | 45 | 18 |

FIG. 11

ACQUIRED DATA STORAGE TABLE

| TIME | X | Y | CAPACITANCE SENSOR | BURIED OBJECT DETERMINATION | BURIED OBJECT | SIZE |
|---|---|---|---|---|---|---|
| 0:00:00 | 1 | 1 | 500 | — | | — |
| 0:00:01 | 1 | 2 | 520 | — | | — |
| 0:00:02 | 1 | 3 | 520 | — | | — |
| 0:00:03 | 1 | 4 | 600 | — | | — |
| 0:00:05 | 2 | 4 | 640 | ○ | JOIST | 40 |
| 0:00:06 | 3 | 5 | 790 | ○ | JOIST | 40 |
| ... | ... | ... | ... | ... | | ... |
| 0:01:05 | 519 | 341 | 400 | — | | — |
| 0:01:06 | 520 | 340 | 340 | — | | — |

FIG. 12

DISPLAY BUFFER AREA

| X | Y | R | G | B |
|---|---|---|---|---|
| 1 | 1 | 255 | 255 | 255 |
| 1 | 2 | 255 | 255 | 255 |
| 1 | 3 | 255 | 255 | 255 |
| 1 | 4 | 255 | 255 | 255 |
| 1 | 5 | 125 | 125 | 125 |
| 1 | 6 | 120 | 120 | 120 |
| ... | ... | ... | ... | ... |
| 960 | 640 | 250 | 200 | 150 |
| 960 | 640 | 250 | 200 | 150 |

FIG. 13

SEARCH IMAGE STORAGE TABLE

| DATE | TIME | IMAGE DATA ID |
|---|---|---|
| 2020/9/18 | 9:50:00 | 200918_1.dat |
| 2020/9/18 | 10:00:00 | 200918_2.dat |
| 2020/9/18 | 11:00:00 | 200918_3.dat |
| 2020/9/20 | 9:00:00 | 200920_1.dat |
| 2020/9/22 | 8:50:00 | 200922_1.dat |
| ... | ... | ... |
| 2020/9/25 | 9:00:00 | 200925_1.dat |
| 2020/9/25 | 18:50:00 | 200925_2.dat |
| 2020/9/25 | 19:00:00 | 200925_3.dat |

FIG. 14

BURIED OBJECT SCANNING DEVICE, DISPLAY CONTROL METHOD FOR BURIED OBJECT SCANNING DEVICE, AND DISPLAY CONTROL PROGRAM

CROSS-REFERENCE TO RELATED APPLICATIONS

This application claims priority to Japanese Patent Application No. 2020-180401 filed on Oct. 28, 2020. The entire disclosure of Japanese Patent Application No. 2020-180401 is hereby incorporated herein by reference.

BACKGROUND

Technical Field

The present invention relates to a buried object scanning device for detecting a buried object such as metal or wood contained in a wall or concrete, as well as a display control method for a buried object scanning device, and a display control program.

Description of the Related Art

In recent years, a device that detects buried objects on the basis of changes in reflected electromagnetic waves emitted toward the surface of concrete, for example, while being moved over the surface of the concrete, as been used as a device for detecting rebar and other such buried objects contained in concrete.

Patent Literature 1 discloses a buried object scanning device including an input unit for inputting data obtained by acquiring, along a side line, signal values of electromagnetic waves that have been reflected by a buried object; a generation unit for generating a virtual waveform template having a spread of the reflected waveforms according to the propagation depth of the electromagnetic waves; and a display unit for displaying both the signal values of the data and a virtual waveform template having a shape corresponding to the propagation depth.

CITATION LIST

Patent Literature

Patent Literature 1: JP-A 2017-040547

SUMMARY

However, the following problem is encountered with the above-mentioned conventional buried object scanning device.

With the buried object scanning device disclosed in the above-mentioned publication, when searching for a buried object, the operator has to perform marking, in which tape is affixed to the concrete surface to correspond to a first scanning range, a second scanning range, and side lines, and this increased the amount of work done by the operator.

It is an object of the present invention to provide a buried object scanning device, a display control method for a buried object scanning device, and a display control program with which no marking work is required during the search for a buried object, which reduces the burden on the operator.

The first invention is a buried object scanning device that detects buried objects contained in a target, comprising a detection unit, a search image conversion processing unit, a memory unit, a display unit, an operation input unit, and a display control unit. The detection unit detects a buried object. The search image conversion processing unit converts the detection result from the detection unit into a search image. The memory unit stores the search image and a grid layer including grid lines corresponding to a specific scale. The display unit displays the search image and the grid layer. The operation input unit receives the input of various operations. The display control unit controls the display unit so that the search image and the grid layer are superimposed and displayed and the search image is displayed in a state of being able to move relative to the grid layer in response to an input to the operation input unit.

Here, in a buried object scanning device that detects buried objects such as wood or rebar contained in a target such as a wall or concrete, for example, a search image obtained by conversion from the detection result in the detection unit and a grid layer including grid lines are displayed superimposed, and the search image is displayed in a state of being movable relative to the grid layer.

The buried object scanning device of the present invention may employ any of various kinds of detection unit, examples of which include a capacitance type that makes use of a capacitance sensor that detects changes in capacitance to detect a buried object, and an electromagnetic wave type that detects a buried object by receiving emitted electromagnetic waves.

Also, the grid layer including the grid lines is, for example, a layer that includes a plurality of grid lines arranged in a grid pattern, with the grid lines disposed at specific intervals.

As a result, when a search image of a buried object stored in the memory unit is displayed on the display unit in a relatively movable state and superimposed with the grid layer including the grid lines, the search image and the grid layer can be moved relative to each other so as to match up a position serving as the reference point with the grid lines, for example.

Consequently, the distance from the position serving as the reference point to the position of the buried object can be easily checked on the display screen of the display unit merely by checking the spacing between the grid lines, without having to mark the wall surface.

As a result, no marking work is required in a search for a buried object, and the burden on the operator can be reduced.

The buried object scanning device according to the second invention is the buried object scanning device according to the first invention, further comprising a scanning unit that senses the movement distance on the surface of the target. The detection unit detects the presence or absence of a buried object each time the movement distance sensed by the scanning unit reaches a specific distance.

Here, an optical sensor or the like is used, for example, as the scanning unit for sensing the amount of movement of the buried object scanning device on the surface of the target.

Consequently, every time the amount of movement of the buried object scanning device on the surface of the target sensed by the scanning unit reaches a specific distance, the detection result for the buried object can be acquired from the detection unit.

As a result, it is possible to obtain a search image in the scanning range and cause the display unit to display the presence or absence of a buried object in each area of the target.

The buried object scanning device according to the third invention is the buried object scanning device according to the first or second invention, wherein the memory unit further stores a reference point display layer that displays the position of a reference point. The display control unit controls the display unit so that the reference point display layer is superimposed on the search image and the grid layer.

Consequently, the reference point display layer including the reference point stored in the memory unit is displayed superimposed on the grid layer including the search image and the grid lines, and can be compared with a reference point attached to the surface of the target when the search for a buried object is started, for example.

As a result, the position, size, and so forth of a buried object that is inside the actual target can be easily recognized while looking at the display screen of the display unit.

The buried object scanning device according to the fourth invention is the buried object scanning device according to the third invention, wherein the display control unit controls the display unit so that the display of the reference point included in the reference point display layer is moved relative to the search image and/or the grid layer in response to an input to the operation input unit.

Consequently, the reference point display layer including the reference point can be moved with respect to the search image and the grid layer so as to align the reference point with a specific position of the grid, for example. This makes it easy to recognize the distance from the reference point to the buried object, the size of the object, and so forth from the spacing of the grid lines on the display screen.

The buried object scanning device according to the fifth invention is the buried object scanning device according to any of the first to fourth inventions, wherein the display control unit controls the display unit so that an enlarged search image is displayed in response to an input to the operation input unit and the display of the grid lines included in the grid layer is changed to match the scale of the enlarged search image.

Consequently, the search image displayed on the display unit is enlarged, and the grid lines are displayed to match the scale of the enlarged search image, which allows the position, size, and so forth of the buried object to be more accurately recognized on the display screen of the display unit.

The buried object scanning device according to the sixth invention is the buried object scanning device according to any of the first to fifth inventions, wherein the memory unit stores a plurality of merged search images corresponding to one search operation generated on the basis of the plurality of search images converted from the detection results in the detection unit.

Here, the search image is, for example, an image acquired every time the movement distance sensed by the scanning unit (an optical sensor or the like) reaches a specific distance. Consequently, a merged search image corresponding to one search scan is generated using a plurality of search images acquired from the start to the end of one search.

Consequently, by using a merged search image from the past few times stored in the memory unit, the presence, position, size, and so forth of the buried object at the place where the search scan was performed in the past can be easily confirmed even after the search scan is finished.

The buried object scanning device according to the seventh invention is the buried object scanning device according to any of the first to sixth inventions, further comprising a size calculation processing unit that calculates the size of the buried object in the scanning direction on the basis of the detection result in the detection unit.

Consequently, the detection results from the detection unit can be used to display the size in the scanning direction of the buried object within the scanning range on the display screen of the display unit.

The buried object scanning device according to the eighth invention is the buried object scanning device according to the seventh invention, wherein the display control unit controls the display unit so as to display the size of the buried object in the scanning direction calculated by the size calculation processing unit.

Consequently, by displaying the size of the buried object included in the search image in the scanning direction on the display unit, not just the position of the buried object but also its size can be recognized on the display screen.

The buried object scanning device according to the ninth invention is the buried object scanning device according to any of the first to eighth inventions, further comprising a data transfer unit that transfers various kinds of information including search images, to an external device.

Consequently, it is possible to transmit a search image, a detection result for a buried object, or the like to an external device such as a server, or a mobile terminal such as a smartphone or tablet terminal owned by a worker who is doing construction, for example.

As a result, a worker, a manager who is overseeing the construction, or the like can carry out the work while looking at various kinds of information such as the search image transferred from the buried object scanning device, the detection result for the buried object, or the like.

The buried object scanning device according to the tenth invention is the buried object scanning device according to any of the first to ninth inventions, wherein the detection unit is a capacitance sensor that senses a capacitance that varies depending on whether or not a buried object is present.

Consequently, an inexpensive capacitance sensor can be used to sense the position of the buried object contained in the target.

The buried object scanning device according to the eleventh invention is the buried object scanning device according to the second invention, wherein the scanning unit is an optical sensor that irradiates the target with light, receives the reflected light, and senses the movement distance.

Consequently, an inexpensive optical sensor can be used to sense the movement distance of the buried object scanning device on the surface of the target.

The display control method for the buried object scanning device according to the twelfth invention is a display control method for controlling the display of the buried object scanning device according to any of the first to eleventh inventions, the method comprising a step of controlling the display unit to display the search image superimposed with the grid layer, and a step of controlling the display unit to display the search image in a state of being movable relative to the grid layer, in response to the input to the operation input unit.

Here, for example, in a buried object scanning device that detects buried objects such as wood or rebar contained in a target such as a wall or concrete, a search image converted from the detection result in the detection unit, and a grid layer including grid lines are displayed superimposed, and the search image is displayed in a state of being movable relative to the grid layer.

Here, the buried object scanning device of the present invention may employ any of various kinds of detection unit, examples of which include a capacitance type that makes use of a capacitance sensor that detects changes in capacitance to detect a buried object, and an electromagnetic wave type that detects a buried object by receiving emitted electromagnetic waves.

Also, the grid layer including the grid lines is, for example, a layer including a plurality of grid lines arranged in a grid pattern, with the grid lines disposed at specific intervals.

As a result, when a search image of a buried object stored in the memory unit is displayed on the display unit in a relatively movable state and superimposed with the grid layer including the grid lines, the search image and the grid layer can be moved relative to each other so as to match up a position serving as the reference point with the grid lines, for example.

Consequently, the distance from the position serving as the reference point to the position of the buried object can be easily checked on the display screen of the display unit merely by checking the spacing between the grid lines, without having to mark the wall surface.

As a result, no marking work is required in a search for a buried object, and the burden on the operator can be reduced.

The buried object scanning device according to the thirteenth invention causes a computer to execute the display control method for controlling the display of a buried object scanning device according to claim 12.

Consequently, the position of a buried object can be confirmed by displaying the buried object search image stored in the memory unit superimposed with the grid layer including the grid lines on the display unit, without having to mark the wall surface.

Therefore, no marking work is needed when a buried object is to be searched for, and the burden on the operator can be reduced.

(Effects)

With the buried object scanning device according to the present invention, no marking work is necessary to search for a buried object, and the burden on the operator can be reduced.

BRIEF DESCRIPTION OF THE DRAWINGS

FIG. 11 is a diagram showing a buried object table stored in the memory unit of the buried object scanning device in FIG. 3;

FIG. 12 is a diagram showing an acquisition data storage table stored in the memory unit of the buried object scanning device in FIG. 3;

FIG. 13 is a diagram showing a display buffer area stored in the memory unit of the buried object scanning device in FIG. 3;

FIG. 14 is a diagram showing a search image storage table stored in the memory unit of the buried object scanning device in FIG. 3;

DETAILED DESCRIPTION

The buried object scanning device 10 and the display control method thereof according to an embodiment of the present invention will now be described with reference to FIGS. 1 to 24.

(1) Configuration of Buried Object Scanning Device 10

Figure 1:
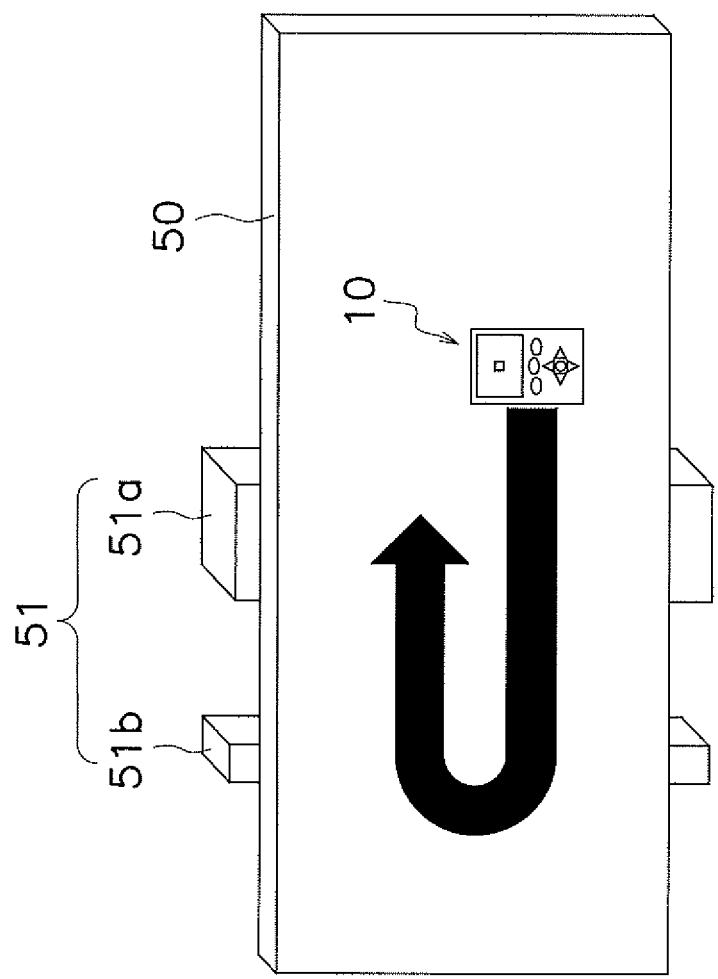
FIG. 1 is a diagram illustrating the state when scanning a wall surface is to be scanned with a buried object scanning device in order to detect a buried object in the wall, using the buried object scanning device according to an embodiment of the present invention.
Figure 2:
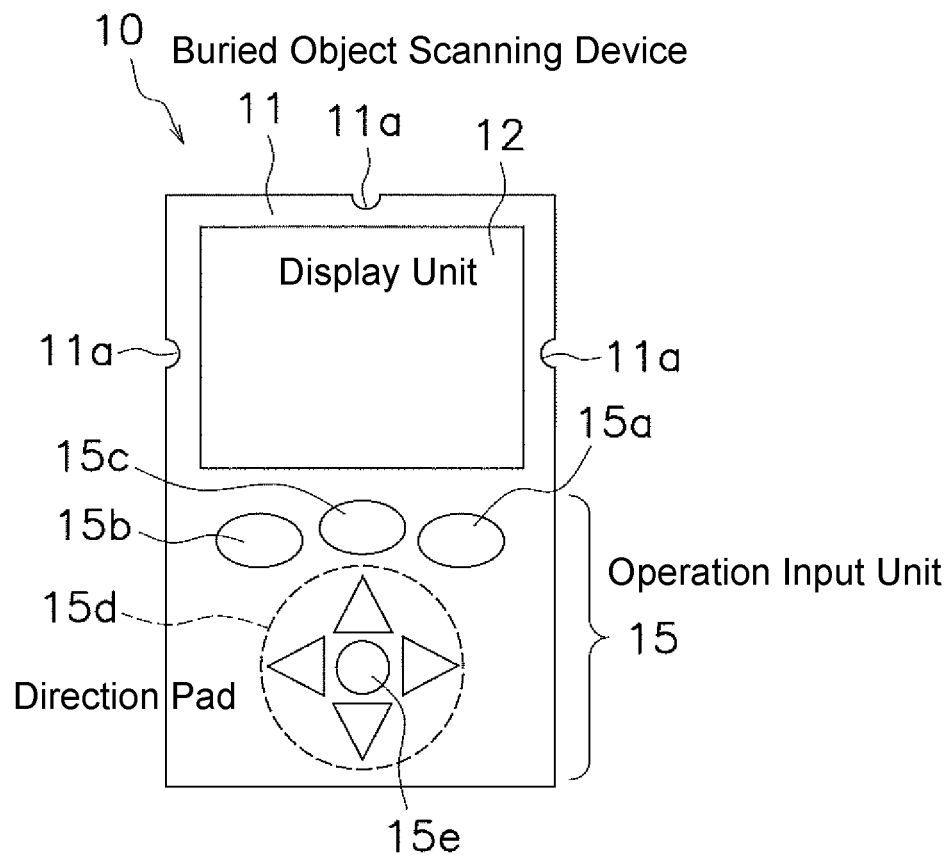
FIG. 2 is an external view of the configuration of the buried object scanning device in FIG. 1.

As shown in FIG. 1, the buried object scanning device 10 according to this embodiment detects changes in capacitance with a capacitance sensor 13 (see FIG. 3) (discussed below) while being moved along a wall surface (target) 50, and thereby detects a buried object 51 such as wood (pillar 51*a*, stud 51*b*), metal, or the like contained in the wall surface 50. As shown in FIG. 2, the buried object scanning device 10 includes a main body 11, a display unit 12, a capacitance sensor 13 (see FIG. 3), an optical sensor 14 (see FIG. 3), and an operation input unit 15.

The wall surface 50 includes, for example, one in which wallpaper or other such decorative material has been attached to the surface of drywall, plywood, or the like. Also, the buried object 51 includes, for example, lumber such as posts, beams, and braces, metal frames, and the like.

As shown in FIG. 2, the main body 11 is a resin member having a substantially cuboid shape, and the display unit 12 and the operation input unit 15 are provided on side of the wall surface 50 that is on the same side as the user (front side), and the capacitance sensor 13 and the optical sensor 14 are provided on the side of the wall surface 50 side that is on the opposite side from the user (rear side).

Recesses 11*a* are provided on the upper end surface and the left and right side end surfaces of the main body 11. These recesses 11*a* are used for marking the wall surface 50 with the scanning start point with a pen or the like when the wall surface 50 is scanned with the buried object scanning device 10.

As shown in FIG. 2, the display unit 12 is, for example, a liquid crystal display device and is disposed on the front side of the main body 11. The display unit 12 displays, for example, the settings of the buried object scanning device 10, a search image showing the detection result for the buried object 51, etc., and what is displayed is switched according to the operation inputted to the operation input unit 15.

The capacitance sensor 13 is disposed on the rear side of the main body 11, and is a sensor that detects changes in capacitance when the buried object scanning device 10 is moved along the wall surface 50, and is used to detect the buried object 51 that is inside the wall surface 50.

The optical sensor 14 is disposed on the rear side of the main body 11, and receives the reflected infrared rays emitted onto the wall surface 50, for example, to the acquire position information of the buried object scanning device 10.

As shown in FIG. 2, the operation input unit 15 is disposed on the surface of the main body 11. The operation input unit 15 includes a power button 15*a*, a grid display button 15*b*, a scale switching button 15*c*, a D-pad (Direction pad) 15*d*, and an enter button 15*e*.

The power button 15*a* is disposed on the upper-right side of the operation input unit 15. The power of the buried object scanning device 10 is turned on or off by holding down this button, for example.

The grid display button 15*b* is disposed on the upper-left side of the operation input unit 15, and is pressed when a grid layer in which a plurality of grid lines are arranged in a grid pattern (discussed below) is superimposed with the search image on the display screen 12*a* of the display unit 12. Also, when the grid display button 15*b* is pressed again in a state in which the grid layer is superimposed with the search image on the display screen 12*a*, a measurement grid (grid lines) is displayed on the display screen 12*a*.

The scale switching button 15*c* is disposed in the upper center part of the operation input unit 15, and is pressed, for example, when the superimposed display of the search image and the grid layer is enlarged.

The D-pad 15*d* is disposed at the lower part of the operation input unit 15, and allows operations to be inputted in four directions: up, down, left, and right. When the D-pad 15*d* is operated up, down, left, or right in a state in which the grid layer including the grid lines is superimposed with the search image, for example, the search image is moved relative to the grid layer.

The enter button 15*e* is disposed in the center position of the D-pad 15*d*, and is pressed when executing a command or the like selected using the D-pad 15*d*, etc.

Figure 3:
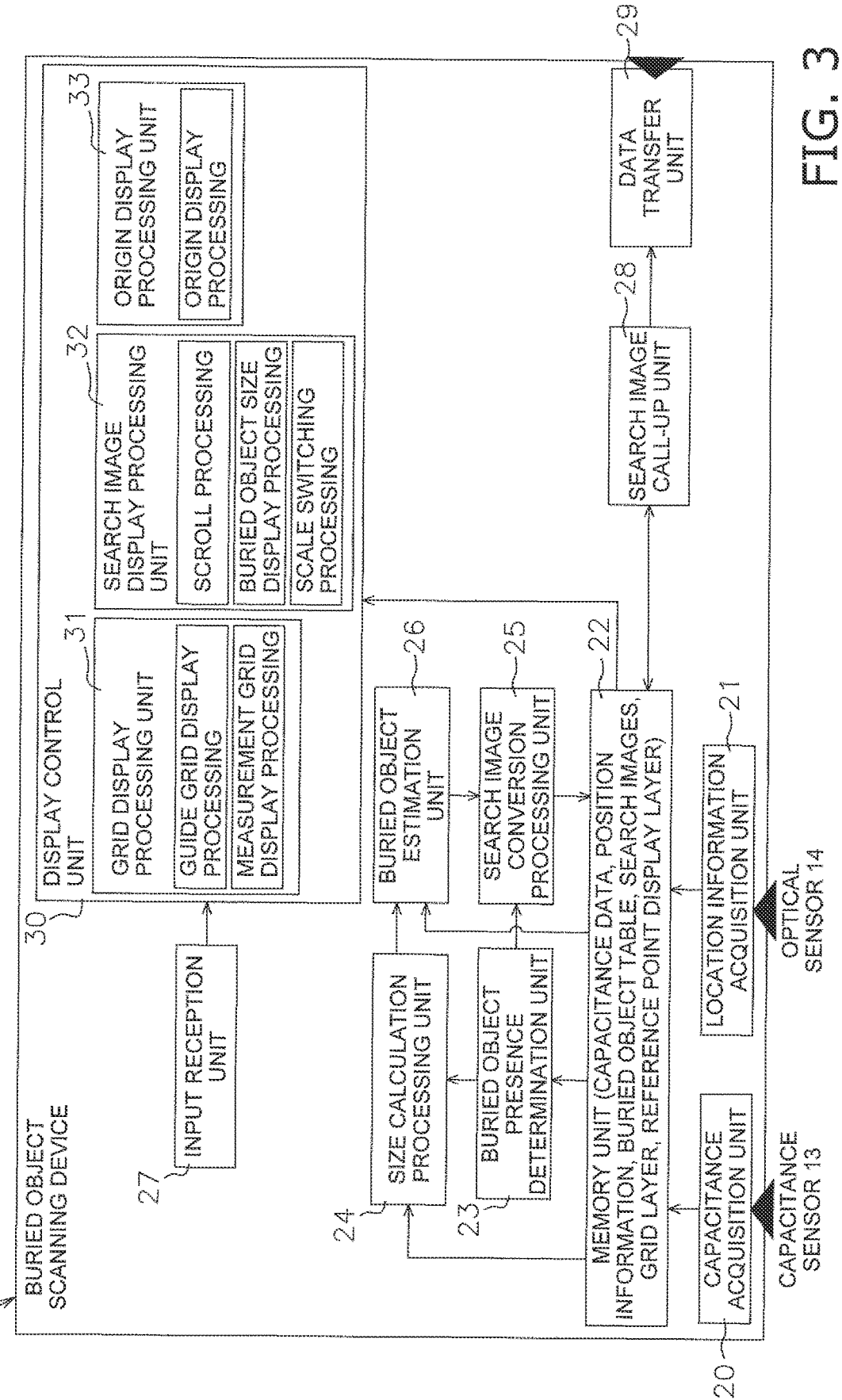
FIG. 3 is a control block diagram of the internal configuration of the buried object scanning device in FIG. 2.

Also, as shown in FIG. 3, the buried object scanning device 10 has a capacitance acquisition unit 20, a position information acquisition unit 21, a memory unit 22, a buried object presence determination unit 23, a size calculation processing unit 24, a search image conversion processing unit 25, a buried object estimation unit 26, an input reception unit 27, a search image call-up unit 28, a data transfer unit 29, and a display control unit 30, all provided inside the main body 11.

The capacitance acquisition unit 20, the position information acquisition unit 21, the memory unit 22, the buried object presence determination unit 23, the size calculation processing unit 24, the search image conversion processing unit 25, the object estimation unit 26, the input reception unit 27, the search image call-up unit 28, the data transfer unit 29, and the display control unit 30 provided inside the buried object scanning device 10 are generated when the CPU reads various control programs stored in the memory.

The capacitance acquisition unit 20 acquires the output from the capacitance sensor 13 disposed on the rear side of the main body 11, and transmits this output to the memory unit 22.

More precisely, the capacitance acquisition unit 20 senses changes in capacitance in order to determine if the buried object 51 is present in the range of movement every time the buried object scanning device 10 reaches a specific movement amount along the wall surface 50, using the position information acquired by the position information acquisition unit 21. Consequently, the search image conversion processing unit 25 (discussed below) can generate a search image in the movement area for each specific movement amount by using the output results from the capacitance sensor 13.

The position information acquisition unit 21 acquires the output from the optical sensor 14 disposed on the rear side of the main body 11, and transmits this output to the memory unit 22. Consequently, the buried object scanning device 10 can sense the position on the wall surface 50 and the amount of movement on the basis of the position information acquired by the position information acquisition unit 21.

The memory unit 22 stores the capacitance data received from the capacitance acquisition unit 20, the position information data received from the position information acquisition unit 21, a buried object table (see FIG. 11) including information about the size the buried object 51 in the scanning direction of the buried object scanning device 10, search images converted from the capacitance data in the search image conversion processing unit 25, a grid layer displayed superimposed with a search image, a reference point display layer, and the like. The memory unit 22 transmits a search image called up by the search image call-up unit 28, etc., to the data transfer unit 29 and the display control unit 30.

The search images stored in the memory unit 22 are stored together with information about the time at which the wall surface 50 was scanned, in a state of being grouped in units of one scan. In this embodiment, search images corresponding to a plurality of scans are stored in the memory unit 22.

Also, search images converted for each specific movement amount are accumulated and stored after the power is turned on to the buried object scanning device 10, and a plurality of search images are stored in a state of being grouped in units of a single scan.

The buried object presence determination unit 23 determines whether a buried object 51 is present under the wall surface 50 (edge determination processing) according to whether or not the output signal (capacitance data) of the capacitance sensor 13 has exceeded a specific threshold value. This makes it possible to determine whether a buried object 51 is present on the basis of the output result of the capacitance sensor 13.

The size calculation processing unit 24 calculates an estimated value of the size (width, etc.) of the buried object 51 under the wall surface 50 on the basis of the output signal (capacitance data) of the capacitance sensor 13. More specifically, the size calculation processing unit 24 detects the edge portions at both ends where the output signal of the capacitance sensor 13 has changed, and calculates the estimated value of the size with the space between the edges as the buried object 51.

The search image conversion processing unit 25 converts the output signal of the capacitance sensor 13 into a search image indicating the presence or absence of a buried object 51. More precisely, the search image conversion processing unit 25 generates a search image by using the capacitance data acquired each time the amount of movement of the buried object scanning device 10 along the wall surface 50 reaches a specific distance, on the basis of the position information for the buried object scanning device 10 sensed by the above-mentioned position information acquisition unit 21.

The buried object estimation unit 26 compares the estimated value of the size (width) of the buried object 51 in the scanning direction calculated by the size calculation processing unit 24, with the width of each type of buried object 51 included in the buried object table (see FIG. 11) stored in the memory unit 22, and estimates the corresponding type of the buried object 51.

The input reception unit 27 receives user operations inputted to the operation input unit 15, including the above-mentioned power button 15*a*, the grid display button 15*b*, the scale switching button 15*c*, the D-pad 15*d*, etc.

The search image call-up unit 28 calls up a search image stored in the memory unit 22 on the basis of the user operation inputted to the operation input unit 15, for example, and transmits this image to the data transfer unit 29 or the display control unit 30.

The display control unit 30 may control the display unit 12 so that after a search image is stored in the memory unit 22, it is displayed in real time during scanning, regardless of the operation inputted by the user to the operation input unit 15.

The data transfer unit 29 transmits search images, the detection result for a buried object 51, and the like to an external device, a server, or the like.

The display control unit 30 causes the display screen 12*a* of the display unit 12 to display a search image (see FIG. 4, etc.) indicating the presence or absence of a buried object 51 generated by the search image conversion processing unit 25 as described above. Furthermore, the display control unit 30 displays the search image, superimposed with the grid layer and the reference point display layer stored in the memory unit 22, on the display screen 12*a* of the display unit 12.

Figure 4:
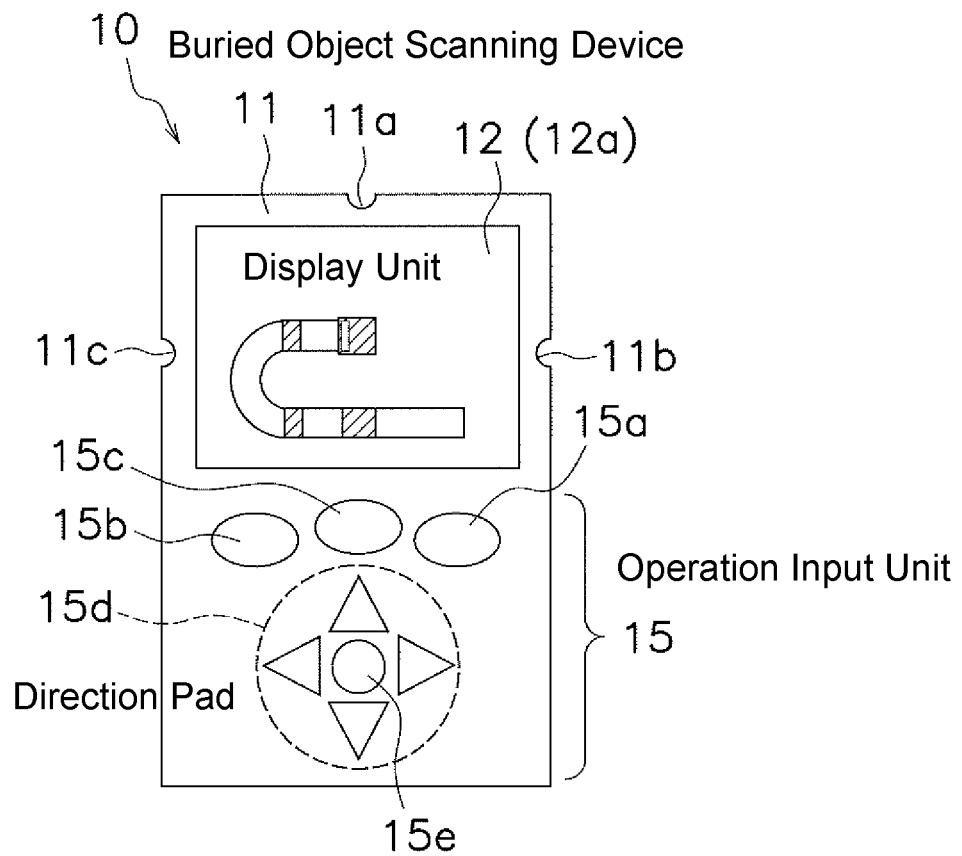
FIG. 4 is a diagram illustrating a display screen of a display unit when the buried object scanning device in FIG. 3 is used to scan a wall surface.

In a search image, as shown in FIG. 4, a plurality of search images generated from the capacitance data acquired along the path of the buried object scanning device 10 scanned over the wall surface 50 are combined to display whether or not a buried object 51 is present.

As shown in FIG. 3, the display control unit 30 also has a grid display processing unit 31, a search image display processing unit 32, and an origin display processing unit 33.

The grid display processing unit 31 performs display processing so that a grid layer including a plurality of grid lines, or a grid layer including a measurement grid (grid lines) prepared for displaying the size of the buried object 51, the distance to the buried object 51, and so forth in an easy-to-understand manner, is superimposed on the search image.

The search image display processing unit 32 performs scroll processing to move the search image with respect to the grid layer (fixed display) on the display screen 12*a* of the display unit 12, and displays on the display screen 12*a* the size of the buried object 51 included in the search image. Furthermore, the search image display processing unit 32 performs processing to switch the display scale of the search image displayed on the display screen 12*a*.

The origin display processing unit 33 performs processing to display a reference point P1 on the grid layer displayed superimposed with the search image on the display screen 12*a*.

The grid layer is a display layer (see FIG. 20A, etc.) including a plurality of grid lines arranged in a grid pattern, and is displayed superimposed on a search image showing whether or not a buried object 51 is present. The display control unit 30 causes the display unit 12 to display the search image in a state of being movable with respect to the grid layer.

In the reference point display layer, for example, the reference point P1 (see FIG. 18, etc.) indicating the scanning start point is displayed on the display screen 12*a* of the display unit 12, superimposed on the search image and the grid layer. The reference point display layer is displayed superimposed on the search image and the grid layer in a state of being able to move with respect to the grid layer (fixed display), similarly to the search image (see FIG. 20B).

The display control of the display unit 12 by the display control unit 30 will be described in detail below.

Generation to Storage of Search Images

With the buried object scanning device 10 in this embodiment, the wall surface 50 is scanned through the above configuration, and as a result, a search image indicating the presence or absence of a buried object 51 under the wall surface 50 is generated on the basis of the change in the capacitance thus obtained.

Figure 5:
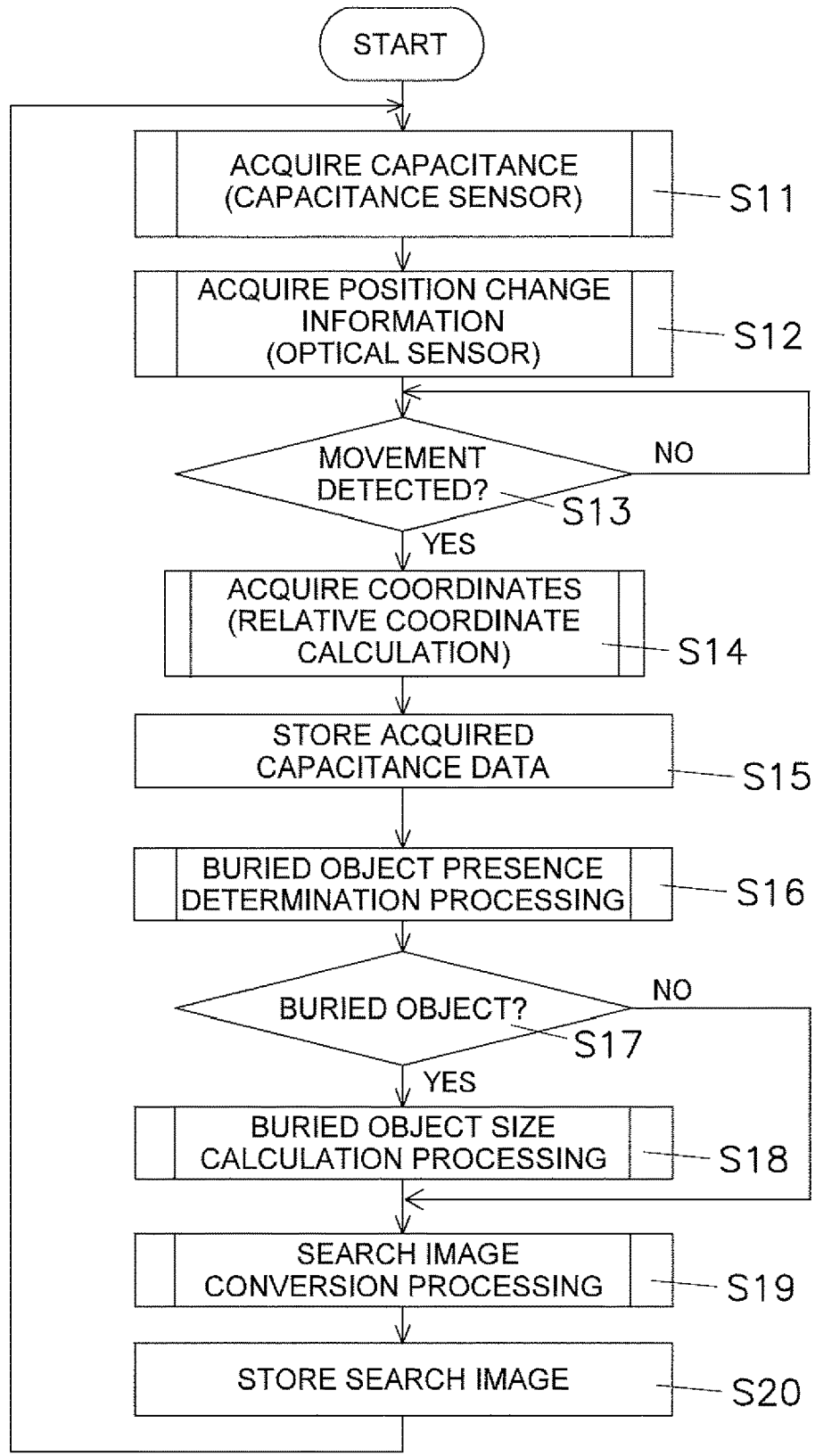
FIG. 5 is a flowchart showing the flow of the search image generation and storage processing in the buried object scanning device in FIG. 3.

Here, the processing to generate a search image will be described below using the flowchart in FIG. 5.

In step S11, the capacitance acquisition unit 20 acquires the capacitance sensed by the capacitance sensor 13.

Next, in step S12, the position information acquisition unit 21 acquires the position information about the buried object scanning device 10 sensed by the optical sensor 14.

Next, in step S13, it is determined, from the position information about the buried object scanning device 10 acquired by the position information acquisition unit 21, whether or not the buried object scanning device 10 has moved along the wall surface 50. If it is determined that the device has moved, the processing proceeds to step S14, and if it is determined that the device has not moved, step S13 is repeated until it is determined that the device has moved.

Next, in step S14, since it was determined in step S13 that the buried object scanning device 10 has moved, the coordinates (relative coordinates) indicating the current position of the buried object scanning device 10 are calculated and acquired.

Next, in step S15, the coordinates of the current position of the buried object scanning device 10 calculated and acquired in step S14 are calculated and acquired as relative coordinates, and the processing proceeds to step S16.

Consequently, for example, every time the position information acquisition unit 21 detects that the position of the buried object scanning device 10 sensed by the optical sensor 14 has reached a specific movement amount, the capacitance data acquired by the capacitance acquisition unit 20 can be saved.

Next, in step S16, the buried object presence determination unit 23 performs processing to determine whether or not a buried object 51 is present in the scanning range on the basis of the acquired capacitance data.

Next, in step S17, the presence determination unit 23 determines whether or not a buried object 51 is present, and if there is, the processing proceeds to step S18, and if not, the processing proceeds to step S19.

Next, in step S18, since it was determined in step S17 that there is a buried object 51, the size calculation processing unit 24 calculates the estimated value of the size (width) of the buried object 51 in the scanning direction of the buried object scanning device 10.

Next, in step S19, the search image conversion processing unit 25 performs processing to convert the capacitance data acquired by the capacitance acquisition unit 20 into a search image, regardless of the presence or absence of a buried object 51.

Next, in step S20, the search image generated in step S19 is stored in the memory unit 22.

In this embodiment, a search image is generated using the capacitance data sensed by the capacitance sensor 13 and is stored in the memory unit 22 in the above steps.

From Start of Scanning to Image Storage

Next, the steps from the start of scanning along the wall surface 50 to the storage processing of the search image in the buried object scanning device 10 of this embodiment will be described using the flowcharts in FIGS. 6 to 10.

(a) Coordinate Acquisition Processing

The coordinate acquisition processing in S14 of FIG. 5 performed by the buried object scanning device 10 in this embodiment will now be described in detail with reference to the flowchart of FIG. 6.

Figure 6:
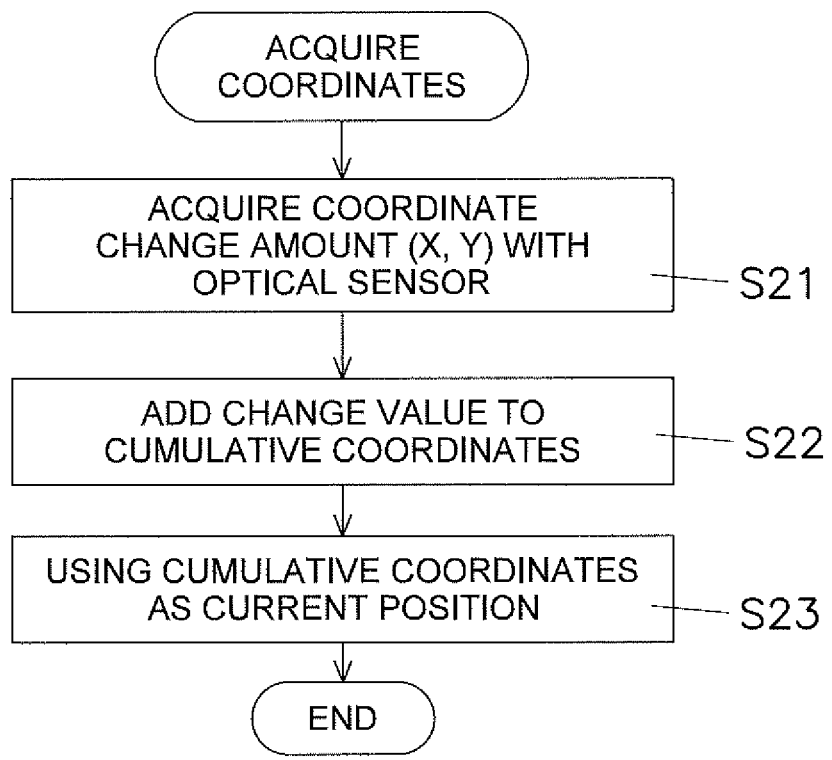
FIG. 6 is a flowchart showing the flow of coordinate acquisition processing during scanning with the buried object scanning device in FIG. 3.

In this embodiment, when scanning along the wall surface 50 is started with the buried object scanning device 10, in step S21 the position information sensed by the optical sensor 14 is acquired as a coordinate change amount (X, Y), as shown in FIG. 6.

Next, in step S22, the coordinate change amount acquired in step S21 is added to the cumulative coordinates.

Next, in step S23, the cumulative coordinates obtained in step S22 are set as the current position of the buried object scanning device 10.

(b) Buried Object Presence Determination Processing

The processing to determine the presence of a buried object 51 in S17 of FIG. 5 performed by the buried object scanning device 10 in this embodiment will now be described in detail with reference to the flowchart of FIG. 7.

First, in step S31, the amount of change in the sensed result of the capacitance sensed by the capacitance sensor 13 is calculated as a determination value.

Next, in step S32, it is determined whether or not the determination value is equal to or greater than a specific threshold value. If the determination value is equal to or more than the specific threshold value, the processing proceeds to step S33, and otherwise the processing proceeds to step S34.

Next, in step S33, since it was determined in step S32 that the determination value is equal to or greater than a specific threshold value, it is determined that there is a buried object 51 in the scanning area, and the processing ends.

On the other hand, in step S34, since it was determined in step S32 that the determination value is less than the specific threshold value, it is determined that there is no buried object 51 in the scanning area, and the processing ends.

(c) Buried Object Estimation Processing

Figure 8:
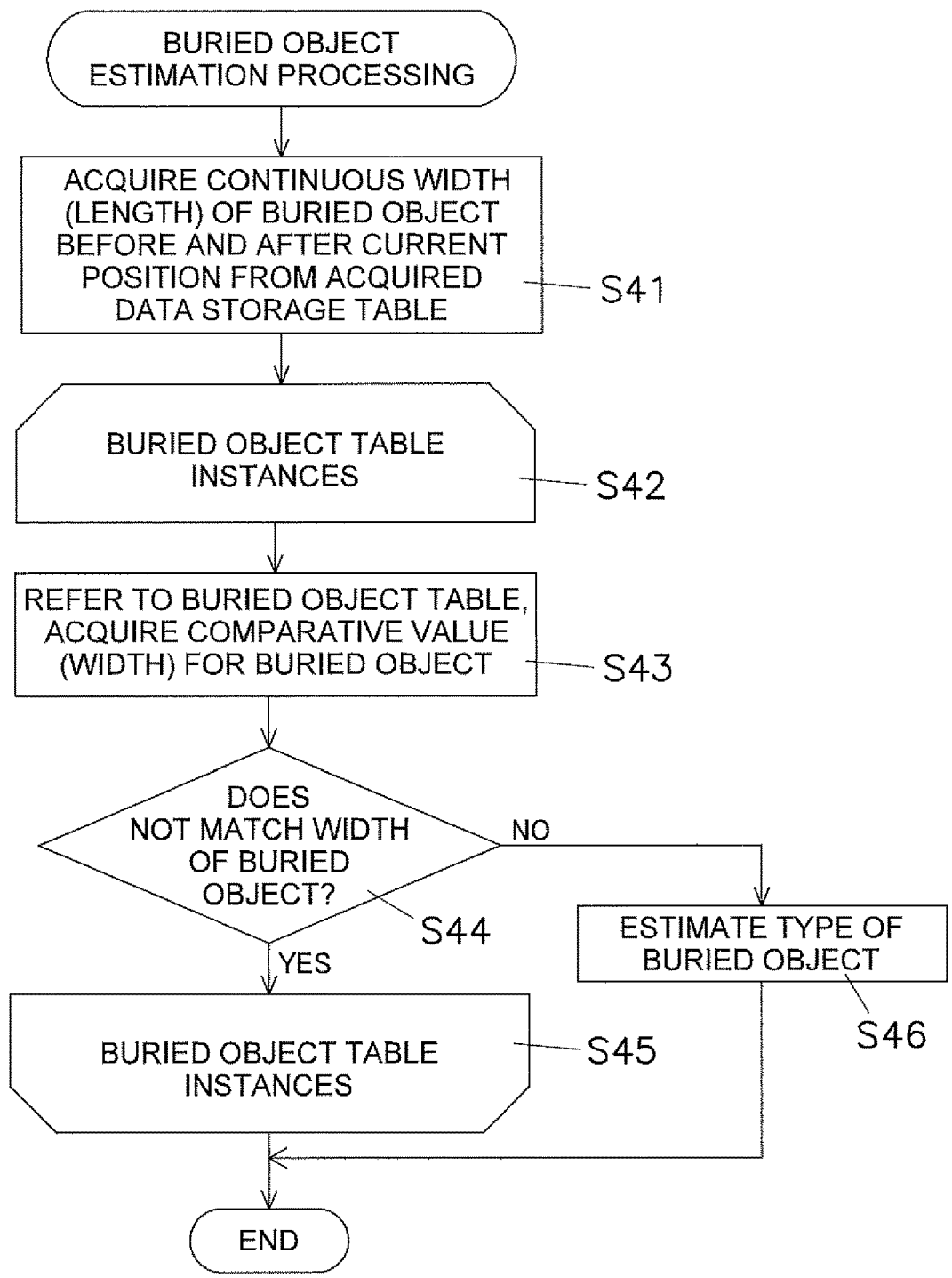
FIG. 8 is a flowchart showing the flow of estimation processing for a buried object included in a search image with the buried object scanning device in FIG. 3.

The processing to estimate the buried object 51 in S18 of FIG. 5 carried out by the buried object scanning device 10 in this embodiment will now be described in detail with reference to the flowchart of FIG. 8.

First, in step S41, the continuous width (length) in the scanning direction of the buried object 51 before and after the current position of the buried object scanning device 10 is acquired from the acquired data storage table shown in FIG. 12.

Here, as shown in FIG. 12, the acquired data storage table includes information about the acquisition time, the coordinates (X, Y), the sensed result from the capacitance sensor, the result of determining a buried object, the type of buried object, and the size.

The type of buried object included in the acquired data storage table shown in FIG. 12 is acquired as follows. Out of information about the name, width, and thickness for each type of the buried object 51 shown in FIG. 11, the width is referred to, this width is compared to the estimated size of the sensed buried object, and the result is the estimated type of the buried object 51.

Next, in the processing of steps S42 to S46, the buried object table shown in FIG. 11 is referred to (S43), and the material (foundation, through-pillar, pillar, stud, beam, brace, joist, furring strip, etc.) matching the continuous width (length) of the buried object 51 in the scanning direction as acquired in step S41 is repeatedly checked a number of times equal to the number of pieces of material (S44).

Then, in step S44, if the width is substantially the same as that of any of the buried objects 51 included in the buried object table, the processing proceeds to step S46 and the type of buried object 51 is estimated. Then, the buried object table is put back so as to reflect the estimation result, and the processing is ended.

On the other hand, in step S44, if the width is not the same as that of any of the buried objects 51 included in the buried object table, the processing of steps S42 to S46 is repeated until all the types in the buried object table have been checked, and the processing is ended.

(d) Search Image Conversion Processing

Figure 9:
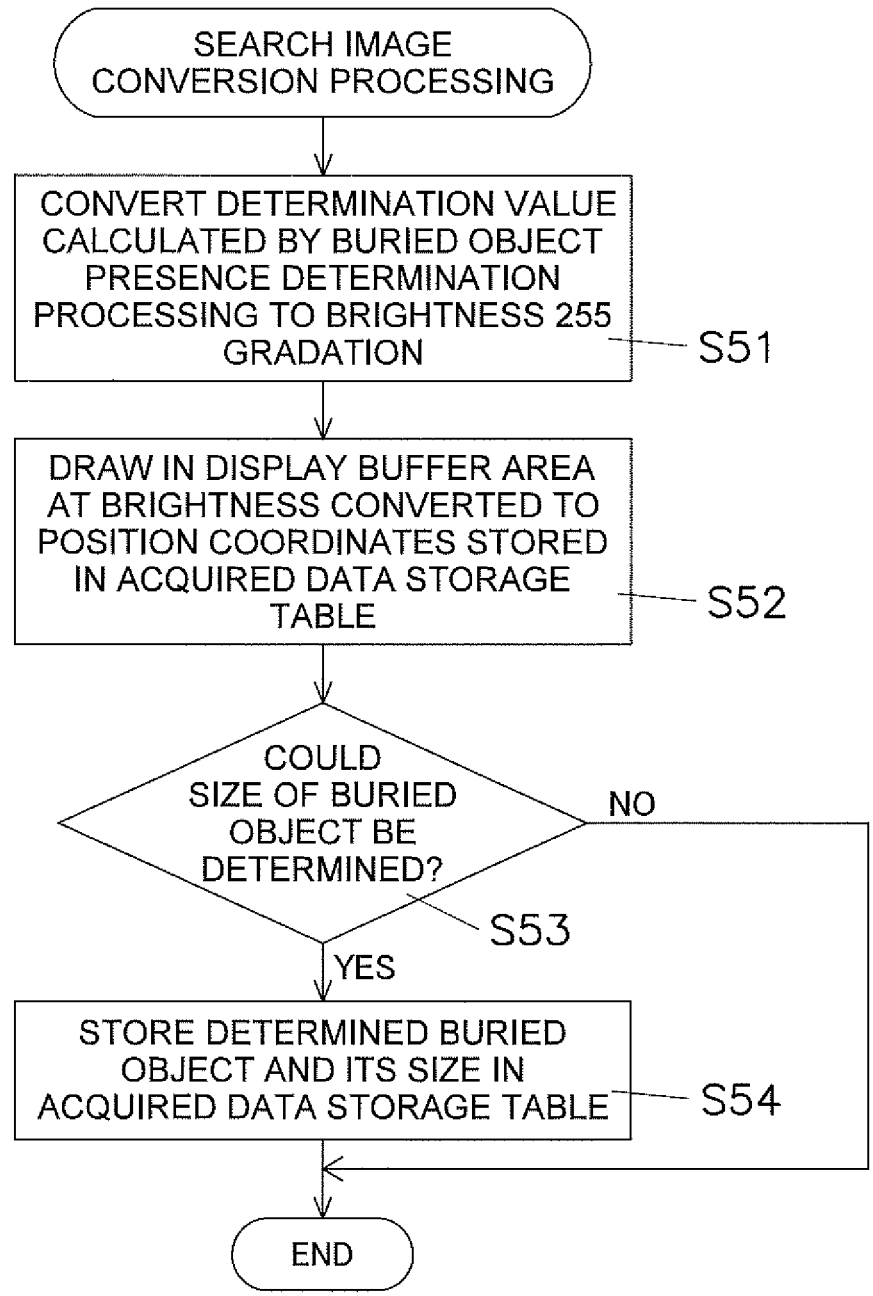
FIG. 9 is a flowchart showing the flow of the search image conversion processing with the buried object scanning device in FIG. 3.

The search image conversion processing in S19 of FIG. 5 carried out by the buried object scanning device 10 of this embodiment will now be described in detail with reference to the flowchart of FIG. 9.

Figure 7:
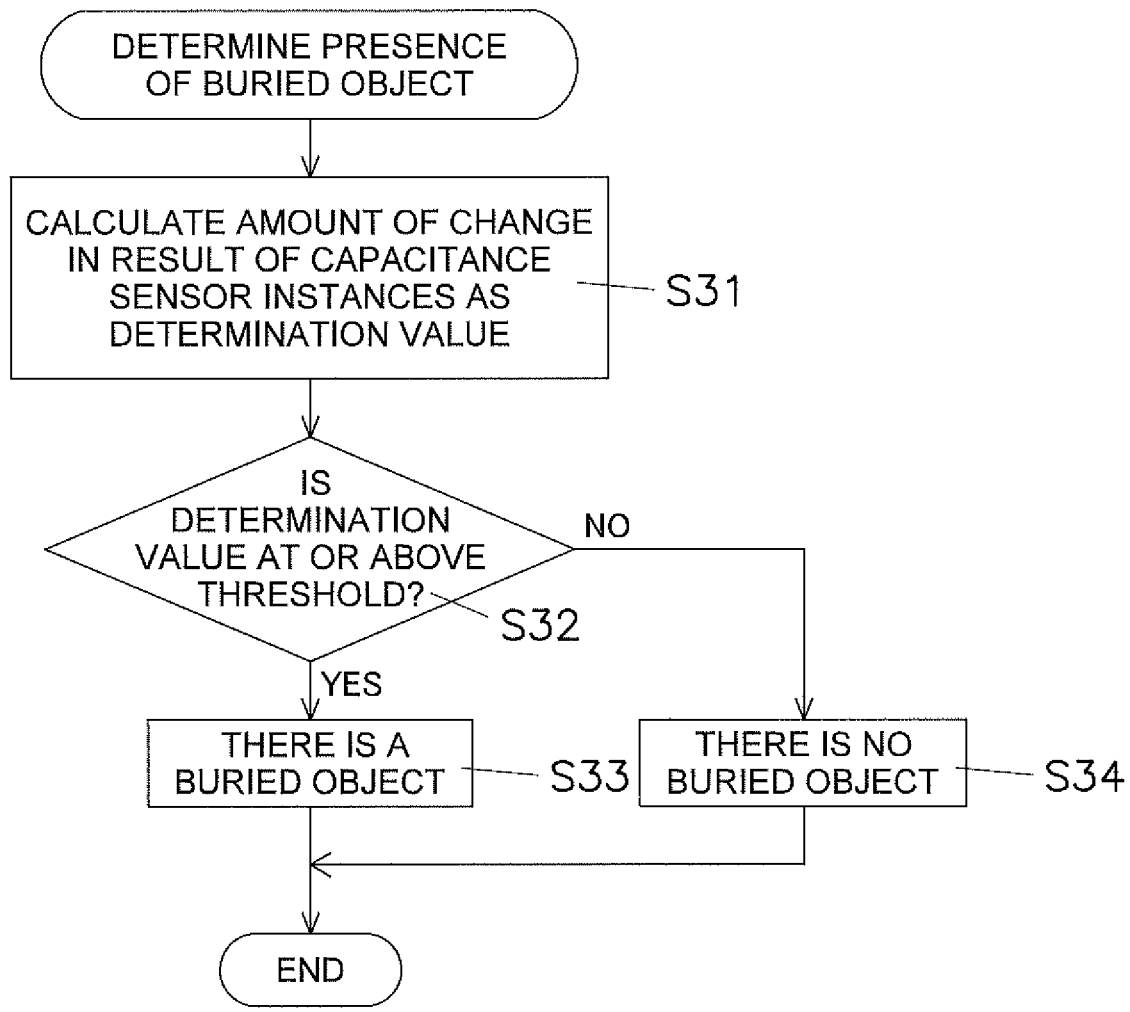
FIG. 7 is a flowchart showing the flow of processing to determine the presence or absence of a buried object with the buried object scanning device in FIG. 3.

First, in step S51, the amount of change (determination value) in the sensed result of the capacitance sensor calculated in S31 of the buried object presence determination processing shown in FIG. 7 is converted into a brightness 255 gradation.

Next, in step S52, a search image is generated by drawing in the display buffer area at the brightness converted to the position coordinates included in the acquired data storage table shown in FIG. 12.

As shown in FIG. 13, the coordinates (X, Y) and the corresponding R, G, and B values are stored in the display buffer area.

Next, in step S53, it is determined whether or not the size of the buried object 51 could be determined. Here, if the size could be determined, the processing proceeds to step S54, and if the size could not be determined, the processing ends.

Next, in step S54, the buried object 51 whose size has been determined and its size (in the scanning direction) are stored in the acquired data storage table shown in FIG. 12, and the processing is ended.

(e) Search Image Storage Processing

Figure 10:
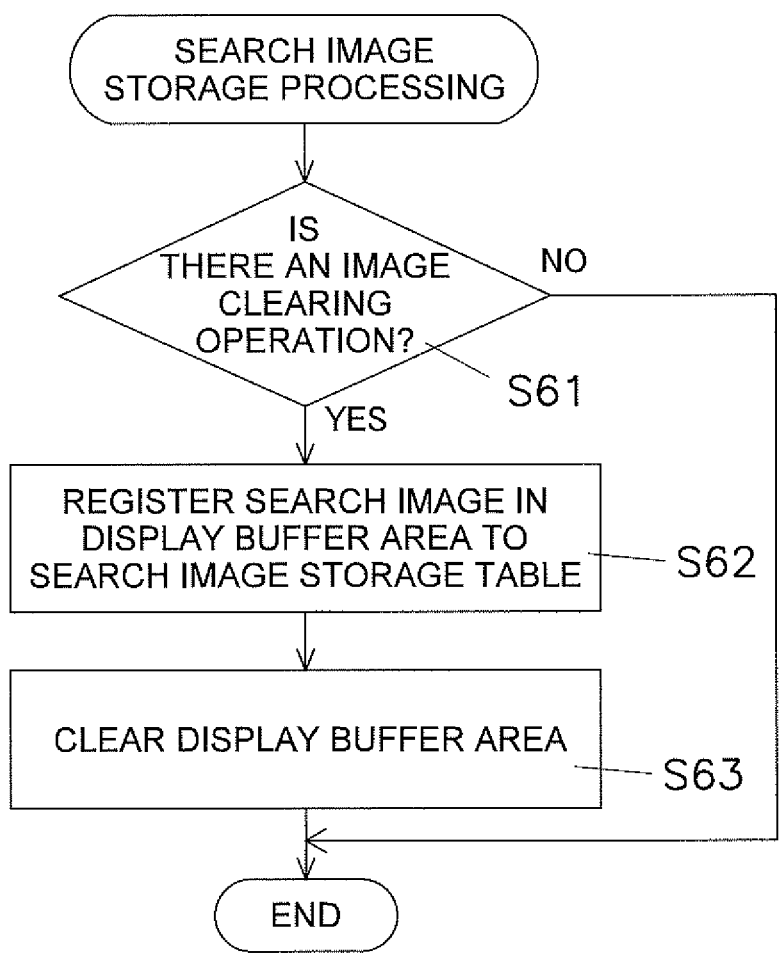
FIG. 10 is a flowchart showing the flow of storage processing for a search image with the buried object scanning device in FIG. 3.

The search image storage processing in S20 of FIG. 5 carried out by the buried object scanning device 10 of this embodiment will now be described in detail with reference to the flowchart of FIG. 10.

First, in step S61, it is determined whether or not an image clearing operation has been received, such as pressing the search start button by the user.

Here, if an image clearing operation has been received, the processing proceeds to step S62, and otherwise the processing ends at that point.

Next, in step S62, the search image in the display buffer area shown in FIG. 13 is registered in the search image storage table shown in FIG. 14 before the screen is cleared.

Here, as shown in FIG. 14, the search image storage table is stored in a state in which the date and time when the search image was generated and the image data ID attached to each search image are associated with each other. The search images stored in the search image storage table are each stored as image data corresponding to one operation.

Next, in step S63, the display buffer area is cleared and the processing ends. Display Control Method of Buried Object Scanning Device 10

The display control method of the buried object scanning device 10 in this embodiment will now be described with reference to FIGS. 15 to 24.

Figure 15:
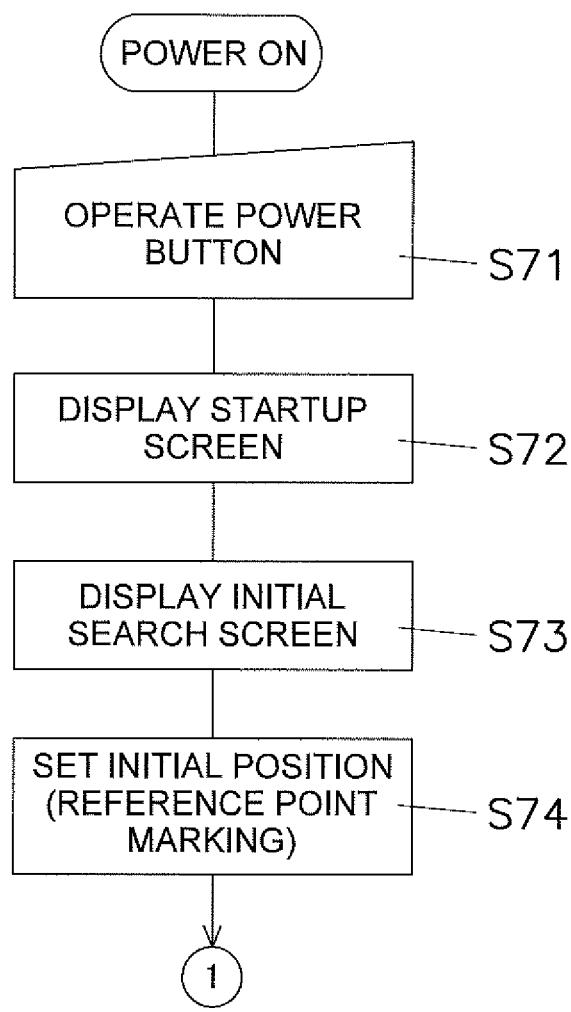
FIG. 15 is a flowchart showing the flow of processing in the display control method of the buried object scanning device in FIG. 3.

(a) Startup and Preparation First, as shown in FIG. 15, if the user operates (holds down) the power button 15a in step S71, then in step S72 the display control unit 30 displays a startup screen on the display screen 12a of the buried object scanning device 10.

Next, in step S73, the display control unit 30 causes the display screen 12a of the buried object scanning device 10 to display the initial search screen following the startup screen.

Figure 16:
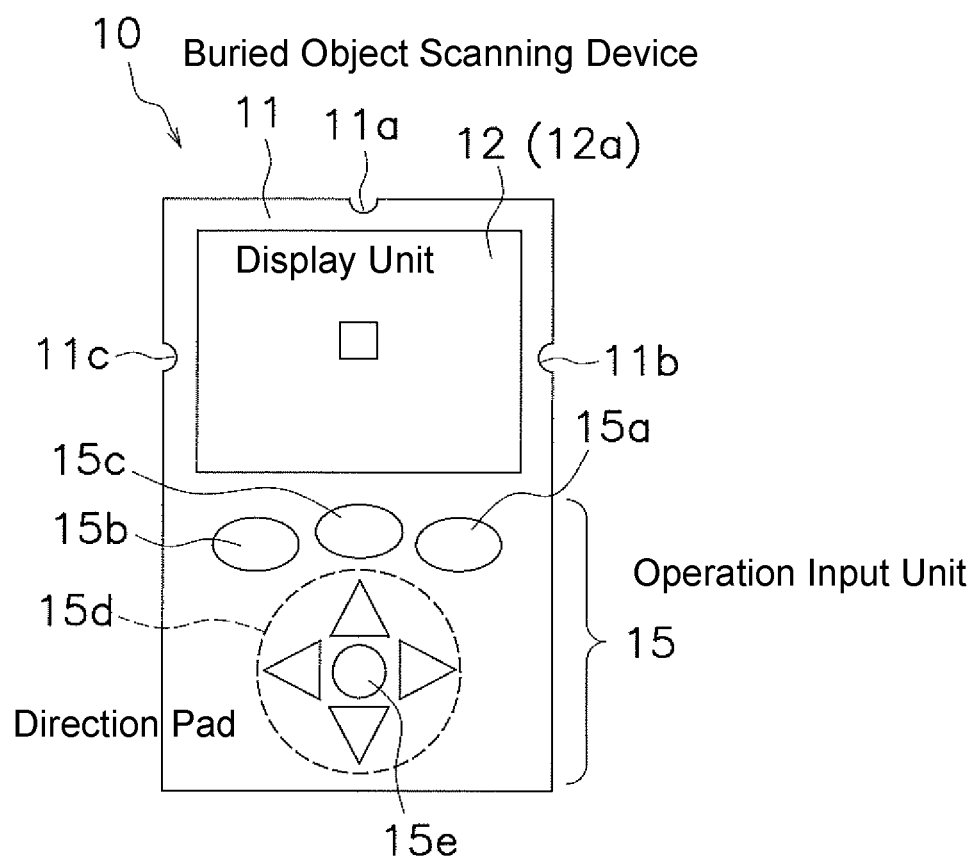
FIG. 16 is a diagram showing an example of the initial search screen displayed on the display screen of the buried object scanning device in FIG. 3.

The initial search screen is, for example, a screen on which a square is displayed in the center of the display screen 12a, as shown in FIG. 16.

Next, in step S74, in a state in which the rear side of the main body 11 of the activated buried object scanning device 10 is pressed against the construction surface (wall surface 50) to be searched, the user engages a pen or the like with the recess 11a and marks the wall surface 50 with a reference point P1 serving as the scanning start point, thereby setting the initial position at the start of scanning.

(b) Search Scanning

Figure 17:
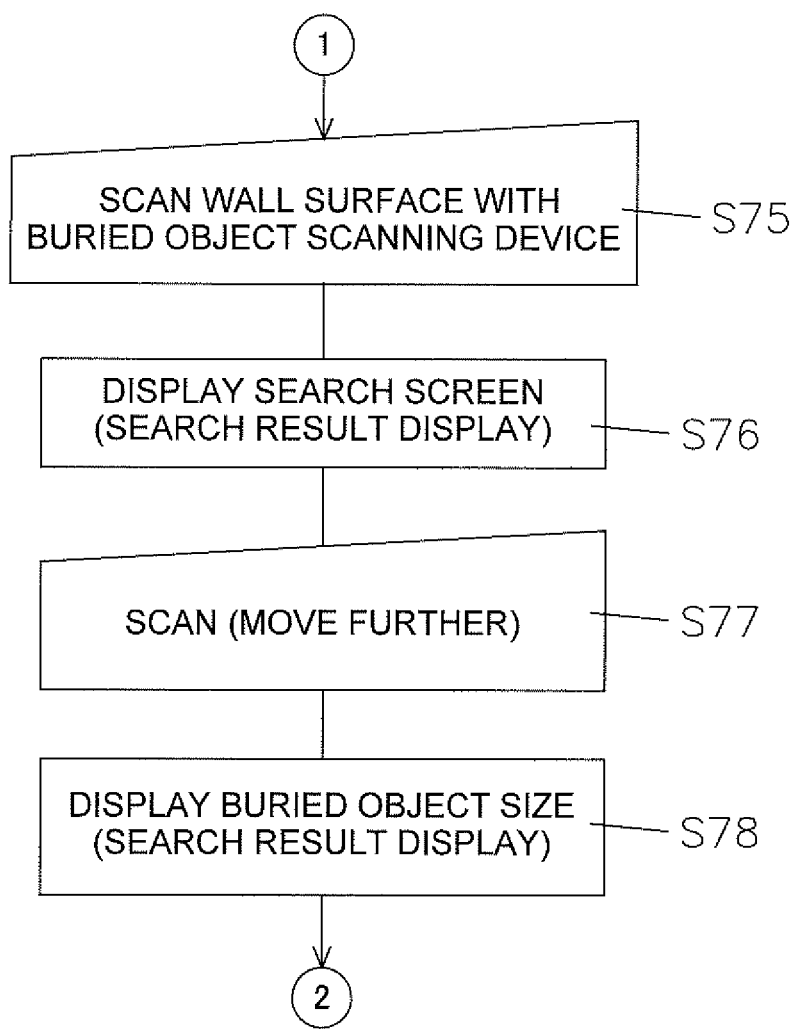
FIG. 17 is a flowchart showing the flow of processing from the start of scanning to the display of the size of the buried object, continuing from the flowchart in FIG. 16.

Next, as shown in FIG. 17, in step S75, the user moves the buried object scanning device 10 along the wall surface 50 to scan along the construction surface.

Next, in step S76, the display control unit 30 (search image display processing unit 32, origin display processing unit 33) displays a reference point display layer including a search image indicating the search result over the scanned range, and a reference point P1 on the display screen 12a of the buried object scanning device 10.

Figure 18A:
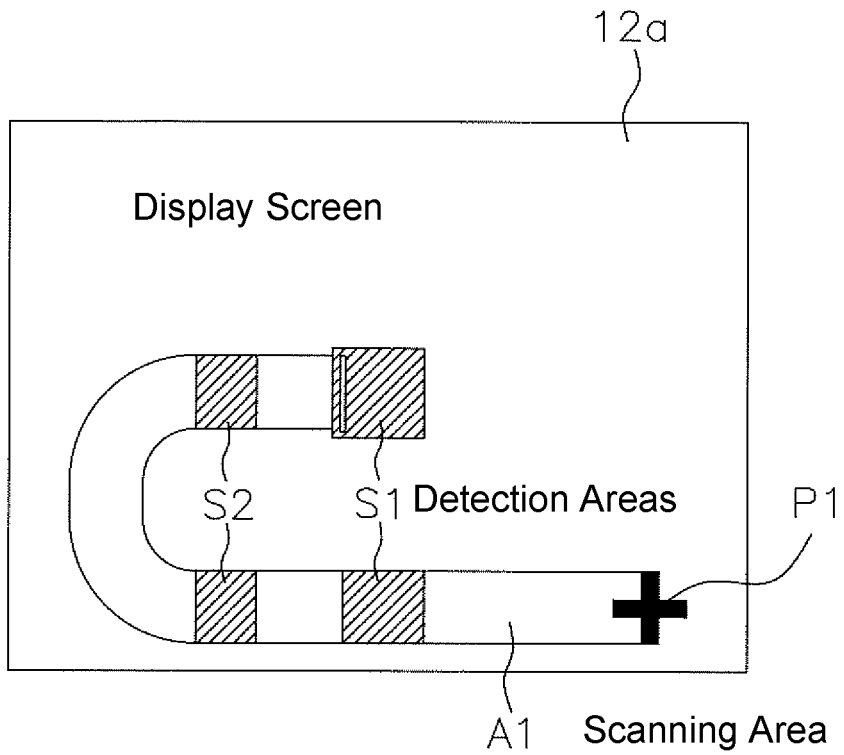
FIG. 18A is a diagram showing the search screen of the buried object scanning device displayed by the processing in the flowchart of FIG. 17.

As shown in FIG. 18A, this search screen includes an area A1 scanned by the buried object scanning device 10, detection areas S1 and S2 indicating the buried object 51 in the scanning area A1, and the reference point P1 at which the scanning was started.

Next, in step S77, the user further scans the wall surface 50 with the buried object scanning device 10.

Figure 18B:
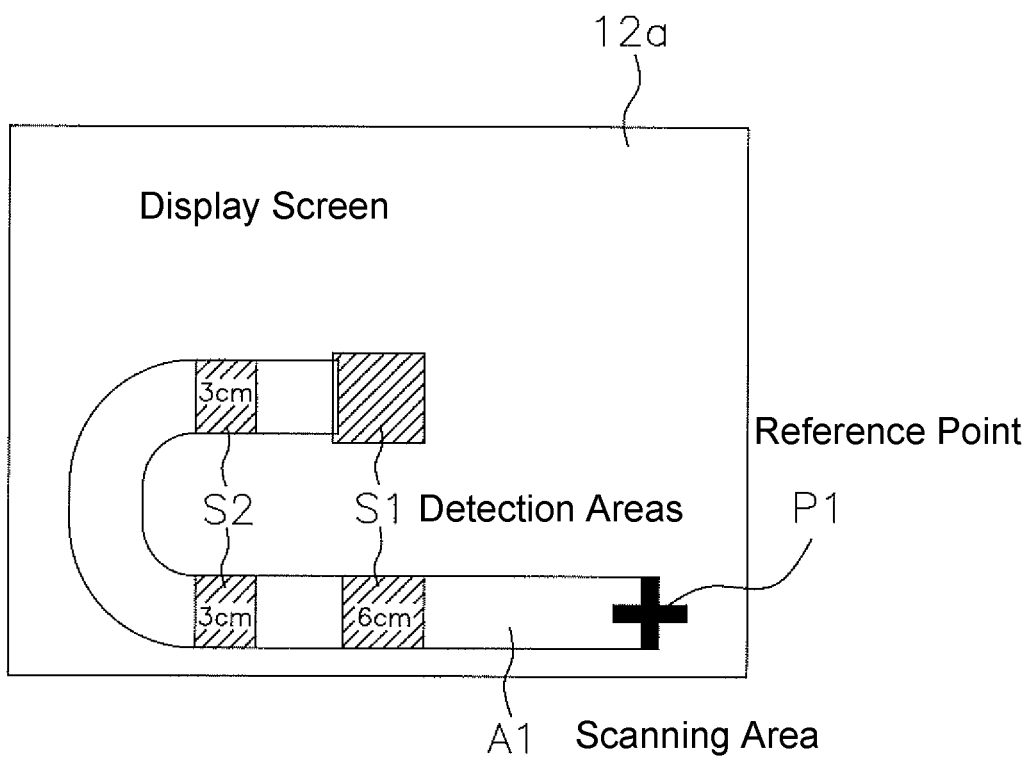
FIG. 18B is a diagram showing a screen on which is displayed the size of the detected buried object on the search screen of FIG. 18A.

Next, in step S78, when search data is accumulated by further scanning in step S77, the display control unit 30 (search image display processing unit 32) causes the calculated size (width) (6 cm, 3 cm) of the buried object 51 in the scanning direction to be displayed on the search image as shown in FIG. 18B.

(c) Grid Display and Alignment Operation

Figure 19:
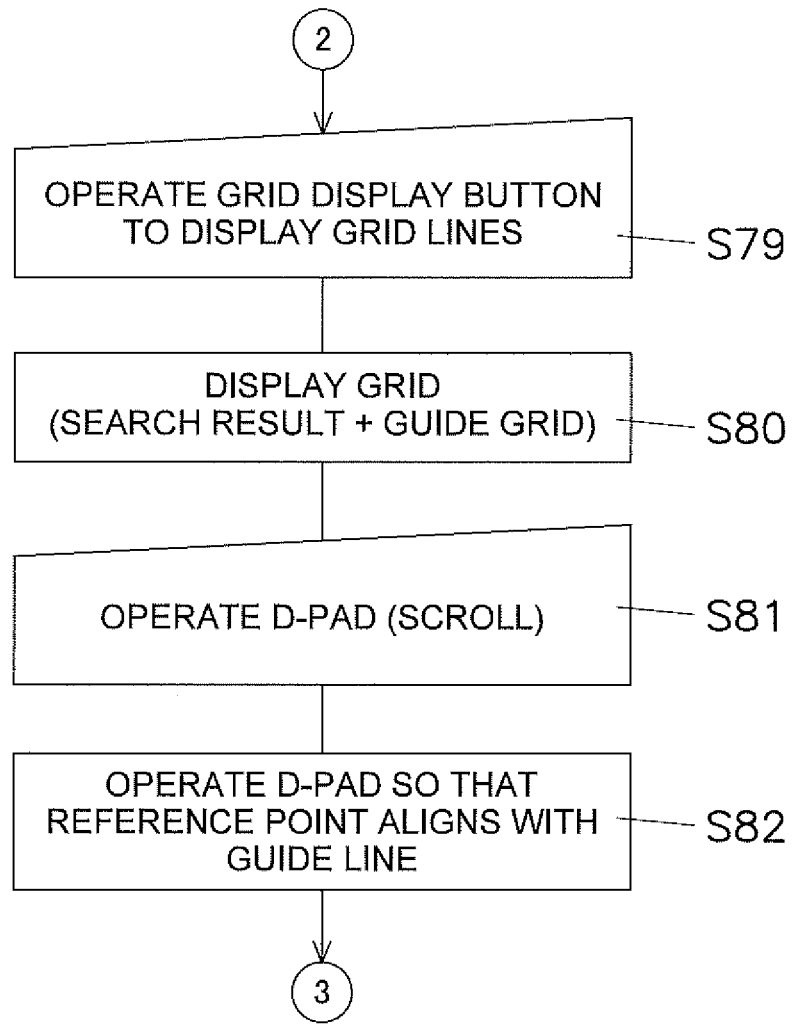
FIG. 19 is a flowchart showing the flow of processing from grid display to position adjustment of the reference point, continuing from the flowchart in FIG. 17.

Next, as shown in FIG. 19, in step S79, after one scan is complete, the user moves the buried object scanning device 10 away from the wall surface 50 and presses the grid display button 15b. If the grid display button 15b has already been pressed, scanning may be performed with the grid layer displayed.

Figure 20A:
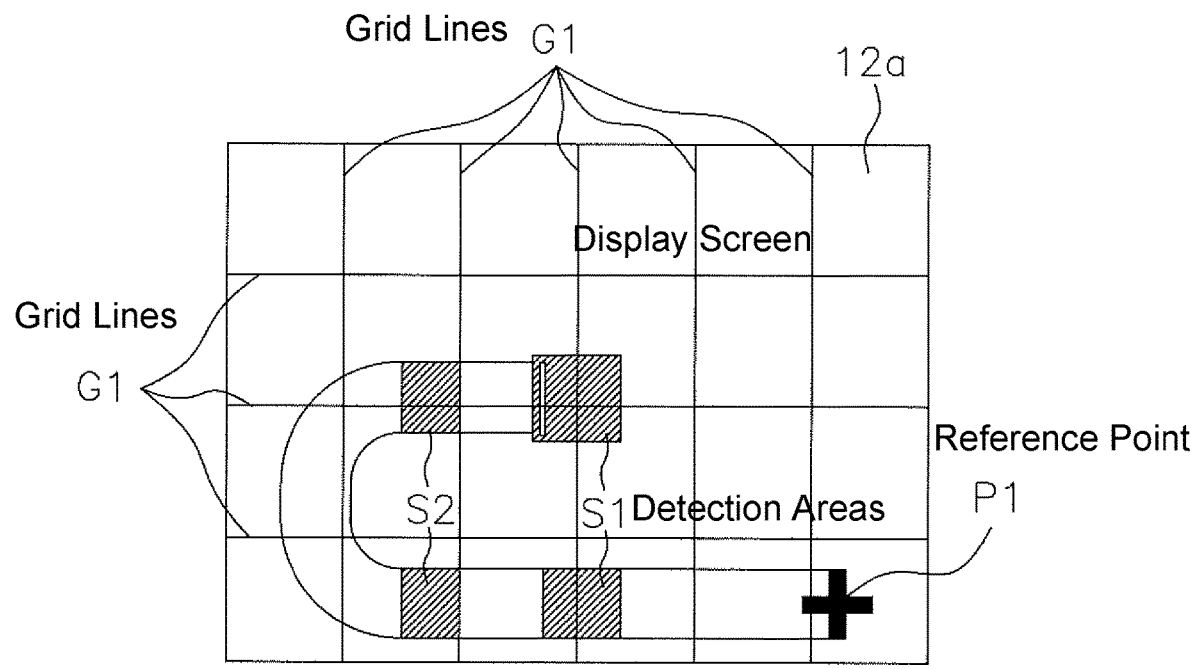
FIG. 20A is a diagram showing a search image and a grid display superimposed on the display screen of the buried object scanning device.

Next, in step S80, as shown in FIG. 20A, the display control unit 30 (grid display processing unit 31) displays a grid layer including a plurality of grid lines G1 arranged in a grid pattern on the display screen 12a of the display unit 12, superimposed on the search image.

Next, in step S81, when the user operates the D-pad 15d in the up, down, left, or right direction on the display screen 12a shown in FIG. 20A, the search image and the reference point display layer including the reference point P1 move relative to the grid layer including the grid lines G1 (fixed display).

Figure 20B:
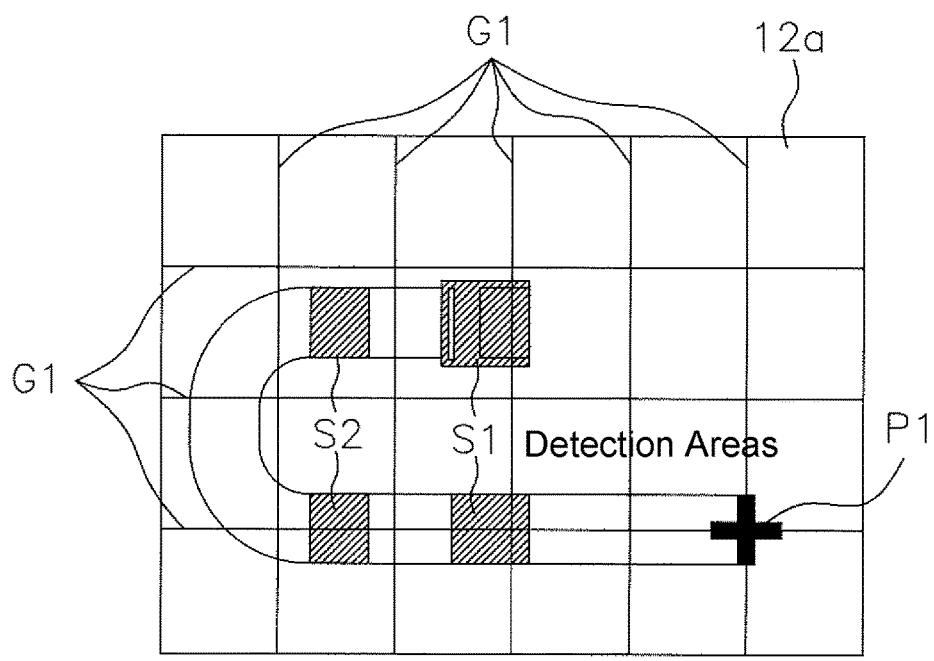
FIG. 20B is a diagram showing the state after adjusting the position of the reference point included in FIG. 20A.

Next, in step S82, when the user operates the D-pad so that the position of the reference point P1 coincides with a specific position of the guide lines, the position of the reference point P1 can be aligned with a specific position of the grid lines included in the grid layer, as shown in FIG. 20B.

Consequently, the position (distance) of the buried object 51 from the reference point P1, the shape of the buried object 51, and so forth can be recognized on the display screen 12a.

(d) Distance and Size of Buried Object by Measurement Grid

Figure 21:
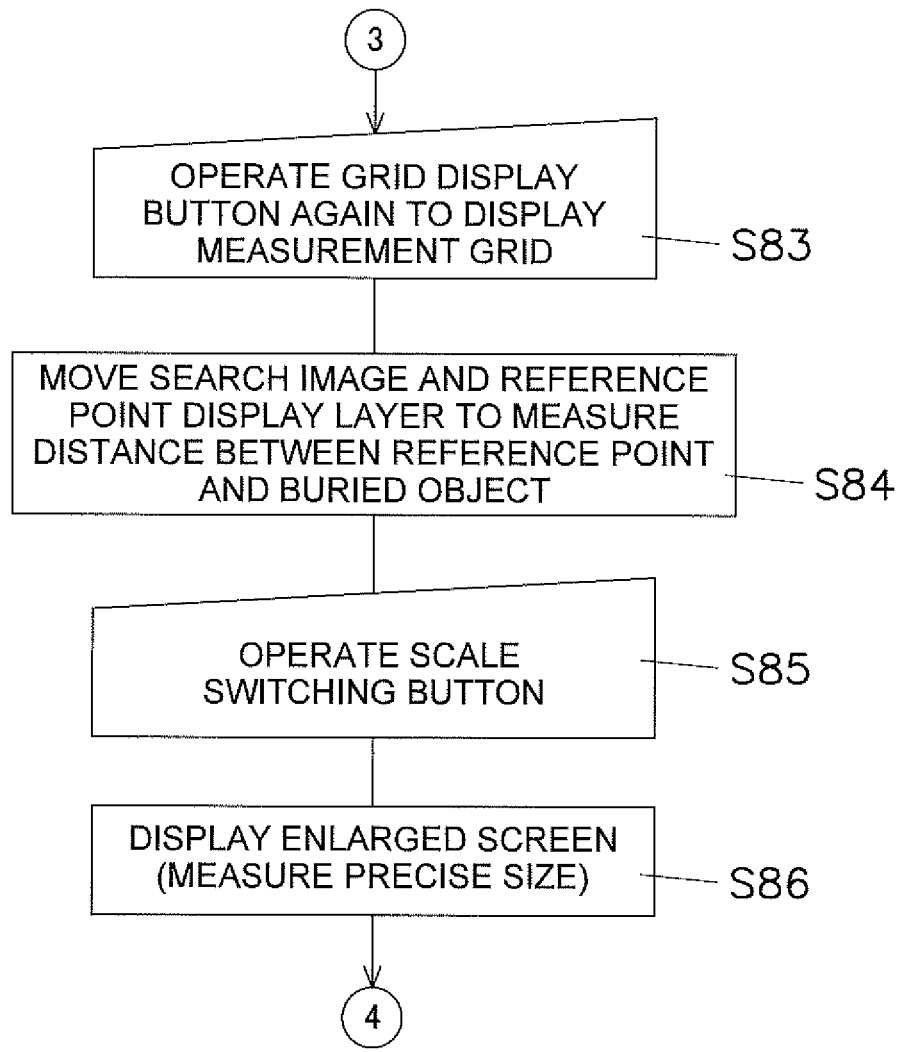
FIG. 21 is a flowchart of the flow of processing from the measurement grid display to the display of the enlarged screen of the reference point, continuing from the flowchart in FIG. 19.
Figure 22A:
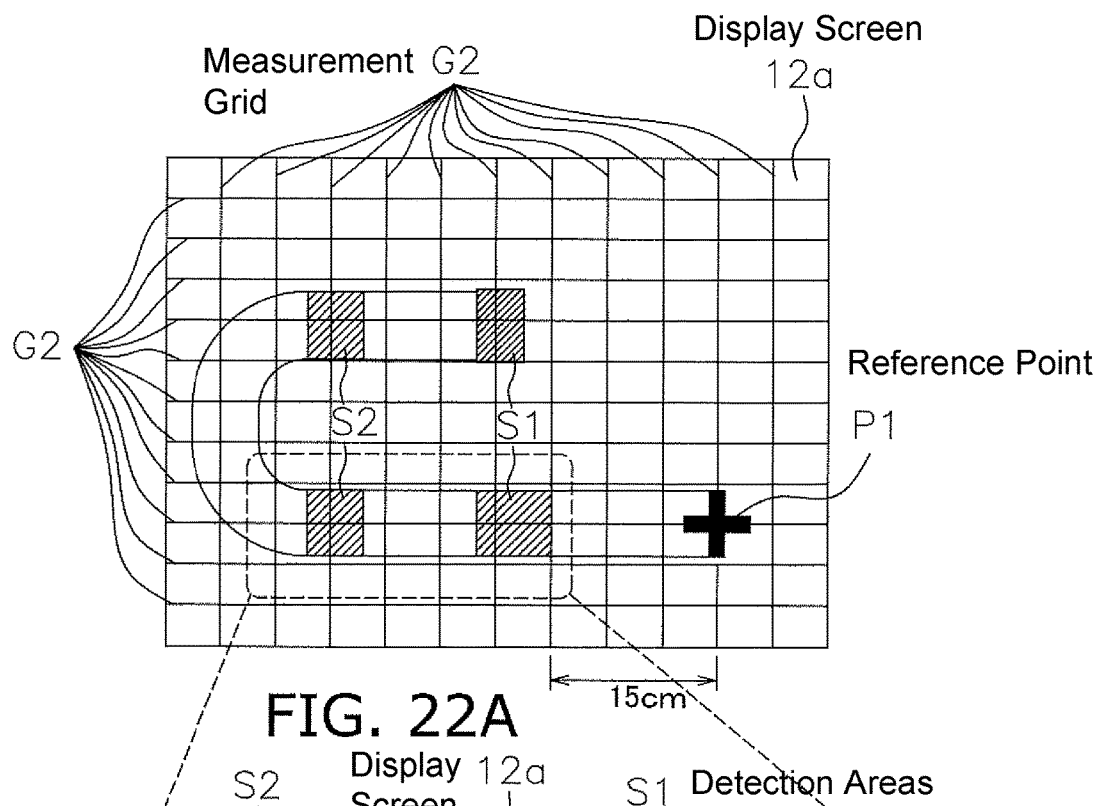
FIG. 22A is a diagram showing a search image and a measurement grid superimposed on a display screen of a buried object scanning device.

Next, as shown in FIG. 21, in step S83, when the user again presses the grid display button 15b, the display control unit 30 (grid display processing unit 31) causes the display screen 12a to display the measurement grid (grid lines) G2 shown in FIG. 22A.

As shown in FIG. 22A, the displayed measurement grid G2 has a narrower spacing than the grid lines shown in FIG. 20A, etc., so that the user can look at the display screen 12a and visually measure the size and distance from the reference point P1 of the buried object 51.

Next, in step S84, when the user operates the D-pad 15d, the display control unit 30 (search image display processing unit 32) moves the search image and the reference point display layer relative to the measurement grid G2 in order to accurately measure the distance between the reference point P1 and the buried object 51 in a state in which a grid layer including the measurement grid G2 is disposed superimposed on the search image.

Consequently, if we let the spacing of the measurement grid G2 shown in FIG. 22A be 5 cm, for example, the user can recognize that the distance from the reference point P1 to the detection area S1 is about 15 cm while looking at the display screen 12a.

Next, in step S85, when the user presses the scale switching button 15c, in step S86, the display control unit 30

Figure 22B:
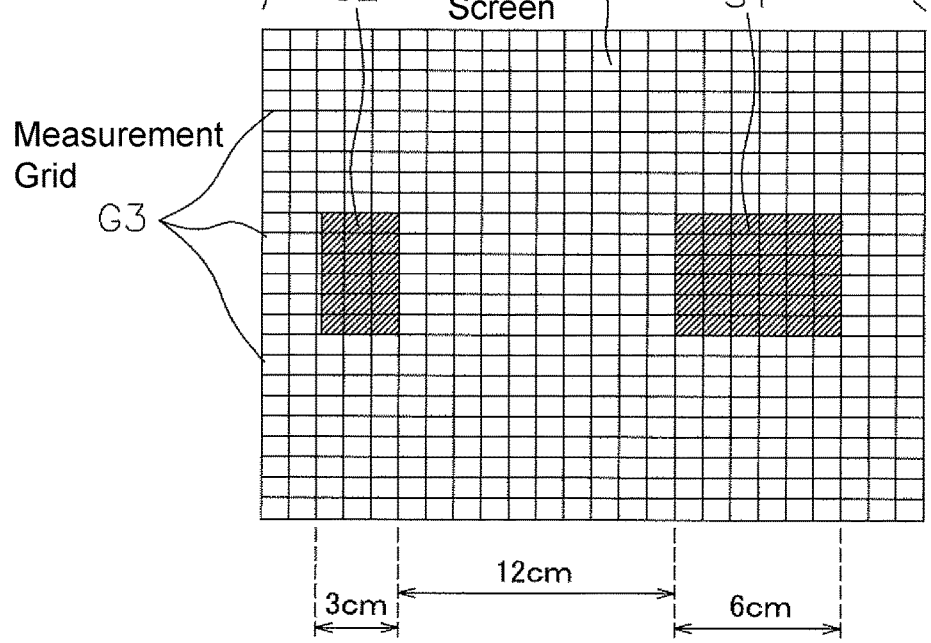
FIG. 22B is a diagram showing an enlarged image of FIG. 22A and the measurement grid corresponding to the enlarged image.

(search image display processing unit 32) displays the area indicated by the dotted line in FIG. 22A in an enlarged view as shown in FIG. 22B.

For example, if we let the spacing of the measurement grid (grid lines) G3 shown in FIG. 22B be 1 cm, the user can look at the display screen 12a while measuring the size more precisely, finding the width of the buried object 51 in the detection area S1 to be about 6 cm, the width of the buried object 51 in the detection area S2 to be about 3 cm, and the spacing between the buried objects 51 in the detection areas S1 and S2 to be about 12 cm.

(e) From Construction Work to Switching Off Power

Figure 23:
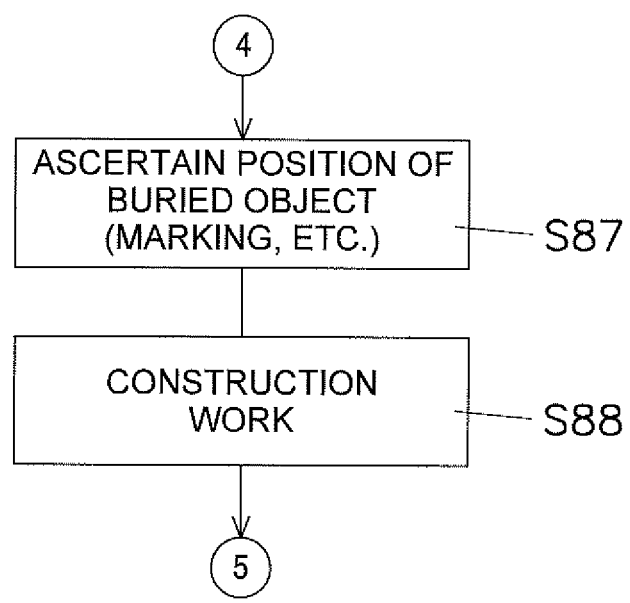
FIG. 23 is a flowchart of showing the ascertaining of the position of the buried object and the flow of construction work, continuing from the flowchart in FIG. 21.

Next, as shown in FIG. 23, on the basis of the distance from the reference point P1 to the buried object 51 measured on the display screen 12a by the processing up to step S86, first, in step S87, the user marks a position 15 cm in the horizontal direction from the position on the wall surface 50 marked as the reference point P1, as the position of the end portion of the buried object 51, in order to ascertain the actual position of the buried object 51.

At this point, marking may be performed only at the construction position and the position where a buried object exists.

Next, in step S88, the user performs various construction operations in a state of being aware of the position of the buried object 51 marked on the wall surface 50.

Figure 24:
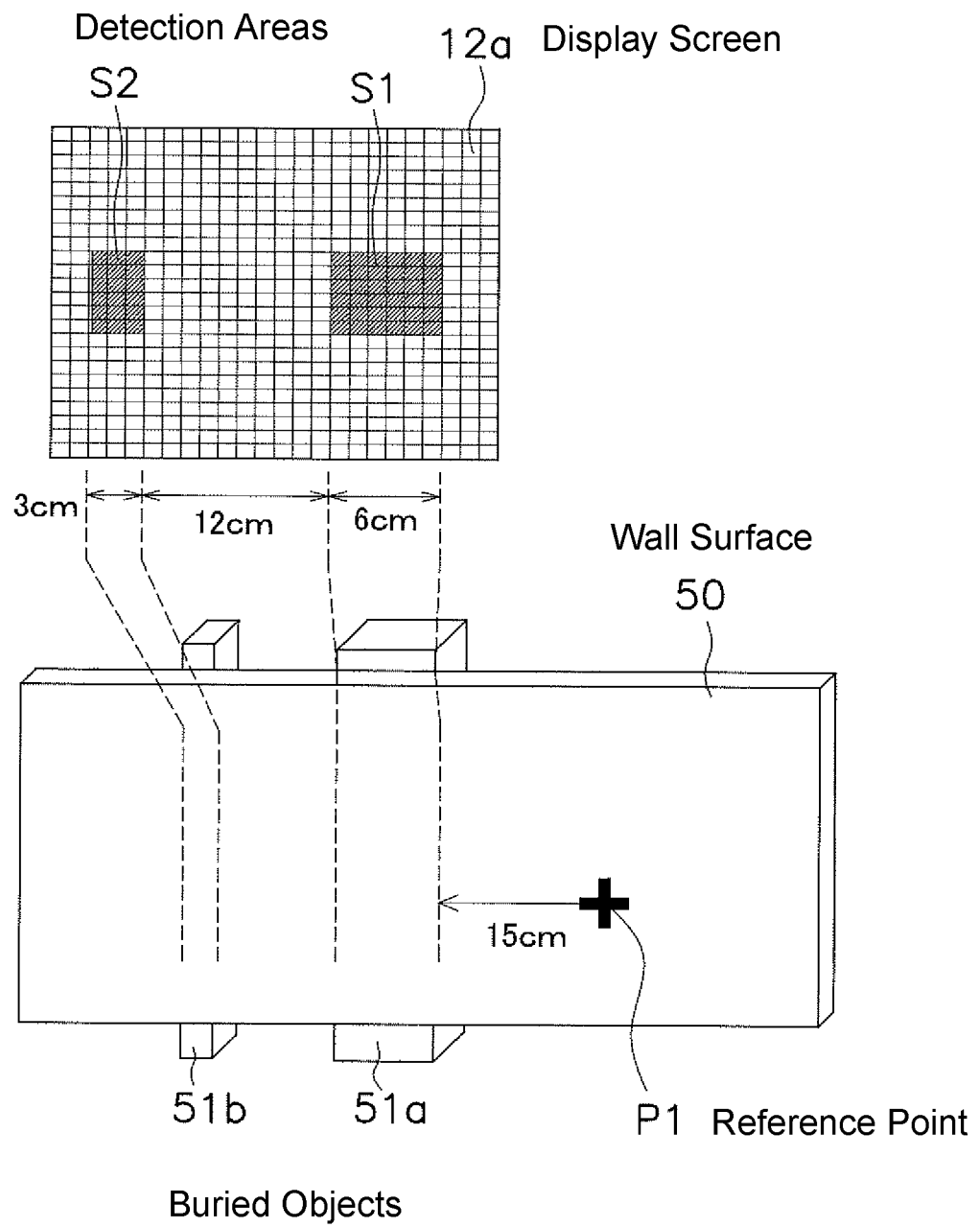
FIG. 24 is a diagram showing construction work for confirming the position of a buried object on an actual wall surface corresponding to the enlarged display of FIG. 22B.

That is, the user performs work on the wall surface 50 (marking if necessary) by using the distance between the reference point P1 and the buried object 51, the size of the buried object 51, and the like displayed on the display screen 12a as shown in FIG. 24, while checking the reference point P1 displayed on the display screen 12a of the buried object scanning device 10, and the position of the buried object 51 in the detection areas S1 and S2.

After this, the user presses the power button 15a to turn off the power, and the work is finished.

OTHER EMBODIMENTS

An embodiment of the present invention was described above, but the present invention is not limited to or by the above embodiment, and various modifications are possible without departing from the gist of the invention.

(A)

In the above embodiment, an example was given in which the present invention was realized as the buried object scanning device 10 and as a display control method for the buried object scanning device 10, but the present invention is not limited to this.

For instance, the present invention may be realized as a display control program for causing a computer to execute the above-mentioned display control method of the buried object scanning device.

This display control program is stored in a memory (memory unit 22) installed in a buried object scanning device, and the CPU reads the display control program stored in the memory and causes the hardware to execute the various steps. More specifically, the same effect as described above can be obtained by having the CPU execute a step of reading the display control program and controlling the display unit to display the above-mentioned search image and the grid layer superimposed, and a step of controlling the display unit to display in a state in which the search image can be moved relative to the grid layer according to the input to the operation input unit.

Also, the present invention may be realized as a recording medium in which a display control program for a buried object scanning device is stored.

(B)

In the above embodiment, an example was given in which the present invention was applied to the capacitance-type buried object scanning device 10, which made use of the capacitance sensor 13 as a sensing unit. However, the present invention is not limited to this.

For instance, the present invention may be applied to an electromagnetic wave-type buried object scanning device that receives a reflected electromagnetic wave that was emitted toward concrete or a wall material, and senses the position of a buried object.

(C)

In the above embodiment, an example was given in which the optical sensor 14 was used as the scanning unit for sensing the amount of movement on the wall surface of the buried object scanning device 10. However, the present invention is not limited to this.

For instance, the amount of movement of the buried object scanning device on the wall surface may be sensed by using a scanning unit that employs something other than an optical method.

(D)

In the above embodiment, an example was given in which the grid layer including the grid lines was in a fixed display, and the search image was moved, so that the search image was displayed in a state of being movable relative to the grid layer. However, the present invention is not limited to this.

For instance, the search image may be in a fixed display, and the grid layer may be displayed in a movable state.

Alternatively, both the search image and the grid layer may be displayed in a movable state as needed.

(E)

In the above embodiment, an example was given in which the buried object scanning device 10 was used to detect a wooden material (pillar, foundation, beam, brace, etc.) contained under a wall surface such as drywall or plywood. However, the present invention is not limited to this.

For instance, the buried object that is detected using the buried object scanning device may be some material other than a wooden material, such as a metal material or a resin material.

Similarly, the target may also be some materials other than a drywall, plywood, or other such wall surface, such as concrete.

That is, the buried object scanning device of the present invention may be used, for example, for detecting other materials or foreign substances located in the ground.

(F)

In the above embodiment, an example was given in which the D-pad 15d was used to move the search image or the reference point display layer relative to the fixedly displayed grid layer on the display screen 12a of the display unit 12 of the buried object scanning device 10. However, the present invention is not limited to this.

For instance, the buried object scanning device may be actually moved over the wall surface, so that the search image is moved on the basis of the information about the movement amount sensed by an encoder, a tracking sensor, or the like.

Alternatively, a cursor may be operated on a table to move the search image 1 mm the first time, 2 mm the second time, and so forth, according to the time change at the button, for example.

(G)

In the above embodiment, an example was given in which three types of grid layer, namely, the standard grid line G1, the measurement grid G3, and the measurement grid G3 for enlarged display, were used. However, the present invention is not limited to this.

For instance, it is preferable to use a grid layer in which appropriately spaced grid lines are arranged according to the size (the size in the scanning direction) of the buried object to be detected.

INDUSTRIAL APPLICABILITY

Since the buried object scanning device of the present invention has the effect of eliminating the need for marking work during buried object search, which reduces the burden on the operator, it can be broadly applied to devices that detect various kinds of buried object.

The invention claimed is:

1. A buried object scanning device that detects buried objects contained in a target, comprising:
    a detection unit comprising a first sensor configured to detect a buried object;
    a display unit comprising a display;
    an operation input unit comprising buttons with which operations are inputted; and
    a processor configured with a program to perform operations comprising:
    operation as a search image conversion processing unit configured to convert a detection result from the detection unit into a search image;
    operation as a memory unit configured to store the search image and a grid layer including grid lines corresponding to a specific scale and a reference point display layer that displays a position of a reference point; and
    operation as a display control unit configured to control the display unit to superimpose the display of the search image and the grid layer such that the grid layer is superimposed on the search image, and to display the search image in a state of being movable with respect to the grid layer to match the reference point to the grid lines in response to an operation being input to the operation input unit and control the display unit to superimpose the display of the reference point display layer on the search image and the grid layer.

2. The buried object scanning device according to claim 1,
    further comprising a scanning unit comprising a second sensor configured to sense a movement distance of the buried object scanning device on a surface of the target,
    wherein the detection unit detects a presence or absence of the buried object each time the movement distance sensed by the scanning unit reaches a specific distance.

3. The buried object scanning device according to claim 2,
    wherein the second sensor of the scanning unit comprises an optical sensor configured to irradiate the target with light, receive a reflected light, and sense the movement distance of the buried object scanning device.

4. The buried object scanning device according to claim 1,
    wherein operation as the display control unit comprises controlling the display unit to move a display of the reference point included in a reference point display layer relative to at least one of the search image and the grid layer in response to an operation being input to the operation input unit.

5. The buried object scanning device according to claim 1,
    wherein operation as the display control unit comprises controlling the display unit to display an enlarged search image in response to an operation being input to the operation input unit and to change a spacing of grid lines included in the grid layer to match a scale of the enlarged search image.

6. The buried object scanning device according to claim 1,
    wherein operation as the memory unit further comprises storing a plurality of merged search images corresponding to one search operation generated on the basis of the plurality of search images converted from the detection results in the detection unit.

7. The buried object scanning device according to claim 1,
    wherein the processor is configured with the program to perform operations further comprising operation as a size calculation processing unit configured to calculate a size of the buried object in a scanning direction on the basis of the detection result in the detection unit.

8. The buried object scanning device according to claim 7,
    wherein operation as the display control unit comprises controlling the display unit to display the size of the buried object in the scanning direction calculated by the size calculation processing unit.

9. The buried object scanning device according to claim 1,
    wherein the processor is configured with the program to perform operations further comprising operation as a data transfer unit configured to transfer information including the search images, to an external device.

10. The buried object scanning device according to claim 1,
    wherein the first sensor of the detection unit comprises a capacitance sensor configured to sense a capacitance that varies depending on whether or not the buried object is present.

11. A display control method for controlling a display of a buried object scanning device that detects buried objects contained in a target, comprising: a detection unit comprising a first sensor configured to detect a buried object; a display unit comprising a display; an operation input unit comprising buttons with which operations are inputted; and a processor configured with a program,
    the method comprising:
    converting a detection result from the detection unit into a search image;
    storing the search image and a grid layer including grid lines corresponding to a predetermined scale;
    controlling the display unit to display the search image superimposed with a grid layer;
    controlling the display unit to display the search image in a state of being movable with respect to the grid layer, in response to an input to the operation input unit, and
    controlling the display unit to superimpose the display of the reference point display layer on the search image and the grid layer.

12. A non-transitory computer readable medium storing a display control program, which when executed causes a computer to perform operations of a display control method for controlling the display of a buried object scanning device comprising: a detection unit comprising a first sensor configured to detect a buried object; a display unit comprising a display; an operation input unit comprising buttons with which operations are inputted; and a processor, the operations comprising:
- converting a detection result from the detection unit into a search image;
- storing the search image and a grid layer including grid lines corresponding to a predetermined scale;
- controlling the display unit to superimpose the grid layer on the search image;
- controlling the display unit to display the search image in a state of being movable with respect to the grid layer in response to an operation being input to the operation input unit; and
- controlling the display unit to superimpose the display of the reference point display layer on the search image and the grid layer.

* * * * *